US008894301B2

(12) United States Patent
Yamada

(10) Patent No.: US 8,894,301 B2
(45) Date of Patent: Nov. 25, 2014

(54) SHOCK-ABSORBING MECHANISM FOR MOVABLE MIRROR OF CAMERA

(71) Applicant: Pentax Ricoh Imaging Company, Ltd., Tokyo (JP)

(72) Inventor: Toshiaki Yamada, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 14/328,945

(22) Filed: Jul. 11, 2014

(65) Prior Publication Data

US 2014/0321842 A1 Oct. 30, 2014

Related U.S. Application Data

(62) Division of application No. 13/683,311, filed on Nov. 21, 2012.

(30) Foreign Application Priority Data

Nov. 29, 2011 (JP) ................................. 2011-260684
Nov. 29, 2011 (JP) ................................. 2011-260685

(51) Int. Cl.
G03B 19/12 (2006.01)

(52) U.S. Cl.
USPC ........................................................ 396/358

(58) Field of Classification Search
USPC ................... 396/354, 356, 358, 447
See application file for complete search history.

(56) References Cited

U.S. PATENT DOCUMENTS

| | | | |
|---|---|---|---|
| 5,606,380 A | 2/1997 | Tatamiya | |
| 5,781,811 A | 7/1998 | Shono | |
| 8,061,908 B2 * | 11/2011 | Yamana et al. | ............... 396/354 |
| 8,753,024 B2 | 6/2014 | Yamada | |
| 2012/0063763 A1 | 3/2012 | Yamada | |
| 2012/0163793 A1 | 6/2012 | Seita | |

FOREIGN PATENT DOCUMENTS

JP 2000-131755 A 5/2000

* cited by examiner

Primary Examiner — Clayton E LaBalle
Assistant Examiner — Minh Phan
(74) Attorney, Agent, or Firm — Greenblum & Bernstein, P.L.C.

(57) ABSTRACT

A movable mirror shock-absorbing mechanism of a camera includes a movable mirror which is rotatable between a viewfinder light-guiding position and a retracted position, a pressing portion which moves with the rotation of the movable mirror, a first shock-absorbing member which is pressed and moved by the pressing portion to absorb shock of the movable mirror when the movable mirror rotates from the retracted position to the viewfinder light-guiding position, and a second shock-absorbing member which is pressed and moved by the pressing portion to absorb shock of the movable mirror when the movable mirror rotates from the viewfinder light-guiding position to the retracted position. The first and second shock-absorbing members are mutually identical in specifications.

10 Claims, 31 Drawing Sheets

SHOCK-ABSORBING MECHANISM FOR MOVABLE MIRROR OF CAMERA

CROSS-REFERENCE TO RELATED APPLICATIONS

This application is a Divisional of pending U.S. application Ser. No. 13/683,311, filed Nov. 21, 2012, which claims the benefit of priority under 35 USC 119 to Japanese Patent Application No. 2011-260684, filed on Nov. 29, 2011, and to Japanese Patent Application No. 2011-260685, filed on Nov. 29, 2011. The entire disclosures of U.S. application Ser. No. 13/683,311 and Japanese Patent Application Nos. 2011-260684 and 2011-260685 are expressly incorporated herein by reference in their entireties.

BACKGROUND OF THE INVENTION

1. Field of the Invention

The present invention relates to a drive mechanism for driving a movable mirror provided in a camera (e.g., an SLR camera), and in particular to a shock-absorbing mechanism, provided in association with the drive mechanism, for the movable mirror.

2. Description of the Related Art

In SLR cameras, a movable mirror (quick-return mirror) is provided, which is capable of moving up and down; more specifically, capable of rotating between a viewfinder light-guiding position (mirror-down position), in which the movable mirror is positioned in a photographing optical path to reflect incident light emanated from an object (object-emanated light) toward a viewfinder optical system, and a retracted position (mirror-up position), in which the movable mirror is retracted from the photographing optical path to allow the object-emanated light to travel toward a shutter. If the movable mirror bounces (vibrates) due to shock caused upon reaching a rotational limit position such as the viewfinder light-guiding position or the retracted position, this bouncing of the movable mirror makes the image that is viewed through the viewfinder unstable, causing an adverse effect on the viewing performance of the viewfinder. Additionally, in a camera which is structured to lead light from an object to a distance measuring sensor and a photometering sensor via a movable mirror, a precise distance measuring operation or photometering operation cannot be performed during such bouncing of the movable mirror, which restricts continuous photographing performance. Due to such reasons, various shock-absorbing mechanisms which absorb shock of the movable mirror when it rotates to suppress bounce of the movable mirror have been proposed (e.g., Japanese Unexamined Patent Publication No. 2000-13755).

To improve a continuous photographing capability of a camera, it is desirable that the bounce of the movable mirror be reduced by absorption of shock of the movable mirror when the movable mirror rotates to the viewfinder light-guiding position (when a mirror-down operation is performed) and when the movable mirror rotates to the retracted position (when a mirror-up operation is performed). Therefore, movable mirror shock-absorbing mechanisms equipped with a shock-absorbing member for suppressing bounce of the movable mirror at the viewfinder light-guiding position thereof and another shock-absorbing member for suppressing bounce of the movable mirror at the retracted position thereof are known in the art. However, separately providing such two shock-absorbing members that respectively function at two different rotational (angular) positions of the movable mirror has been a cause of increasing the production cost.

In addition, a member, which applies a load on the rotation of the movable mirror in the reverse direction (bouncing direction) upon the movable mirror reaching the viewfinder light-guiding position or the retracted position, only needs to be provided to suppress bounce of the movable mirror. However, if the load exerted on the movable mirror from the bounce-suppressing member is excessively great, this load may interfere with improvement in the operational speed of the movable mirror. Specifically, at an initial stage of the rotation of the movable mirror from a state where the movable mirror is at the viewfinder light-guiding position or the retracted position, rotational resistance tends to be great, and accordingly, it is desirable that loads on the movable mirror be reduced as much as possible.

SUMMARY OF THE INVENTION

The present invention has been devised in view of the above described problems and provides a shock-absorbing mechanism, provided for a movable mirror of a camera, which contributes to an improvement in continuous photographing capability even though the shock-absorbing mechanism is simple in structure and can be produced at low cost.

The present invention also provides a shock-absorbing mechanism, provided for a movable mirror of a camera, which reduces loads on the initial motion of the movable mirror, thereby contributing to an improvement in continuous photographing capability.

According to an aspect of the present invention, a movable mirror shock-absorbing mechanism of a camera is provided, including a movable mirror which is supported to be rotatable between a viewfinder light-guiding position, in which the movable mirror is positioned in a photographing optical path to reflect incident light emanated from an object toward a viewfinder optical system of the camera, and a retracted position, in which the movable mirror is retracted from the photographing optical path to allow the object-emanated light to travel toward a photographic light-receiving medium; a pressing portion which moves with the rotation of the movable mirror; a first shock-absorbing member which is pressed and moved by the pressing portion to absorb shock of the movable mirror when the movable mirror rotates from the retracted position to the viewfinder light-guiding position; and a second shock-absorbing member which is pressed and moved by the pressing portion to absorb shock of the movable mirror when the movable mirror rotates from the viewfinder light-guiding position to the retracted position. The first shock-absorbing member and the second shock-absorbing member are mutually identical in specifications.

It is desirable for the first shock-absorbing member to be supported to be movable linearly in a direction intersecting a rotational path of the movable mirror, is biased in a first biasing direction away from a rotational axis of the movable mirror by a first biaser to be held at a shock-absorbing stand-by position at which the first shock-absorbing member lies in a moving path of the pressing portion, and is pressed and moved in a direction opposite to the first biasing direction of the first biaser by the pressing portion; and for the second shock-absorbing member to be supported to be movable linearly in a direction intersecting the rotational path of the movable mirror, is biased in a second biasing direction away from the rotational axis of the movable mirror by a second biaser to be held at a shock-absorbing stand-by position at which the second shock-absorbing member lies in the moving path of the pressing portion, and is pressed and moved in a direction opposite to the second biasing direction of the second biaser by the pressing portion.

It is desirable for a surface of each of the first shock-absorbing member and the second shock-absorbing member which is pressed by the pressing portion to have an asymmetrical shape with respect to an imaginary center line which respectively extends in the linear moving direction of the each of the first shock-absorbing member and the second shock-absorbing member and which respectively passes through a lateral center of the each of the first shock-absorbing member and the second shock-absorbing member thereof. The first shock-absorbing member and the second shock-absorbing member are supported with sides of one of the first shock-absorbing member and the second shock-absorbing member reversely arranged with respect to sides of the other of the first shock-absorbing member and the second shock-absorbing member being.

This structure makes it easy to achieve an optimum bounce suppressing capability to each shock-absorbing member.

It is desirable for the surface of each of the first shock-absorbing member and the second shock-absorbing member to include an outer-edge cam surface which is positioned on an outer edge of the surface that is farthest from the rotational axis of the movable mirror; and a pair of inclined cam surfaces which are connected to opposite ends of the outer-edge cam surface, respectively, and wherein each of the pair of inclined cam surfaces is inclined toward the rotational axis of the movable mirror in a direction away from the outer-edge cam surface. The outer-edge cam surface and the pair of inclined cam surfaces are positioned in the moving path of the pressing portion when the first shock-absorbing member and the second shock-absorbing member are held at respective the shock-absorbing stand-by positions thereof. When the movable mirror rotates from the retracted position to the viewfinder light-guiding position, the pressing portion presses a first inclined cam surface of the pair of inclined cam surfaces of the first shock-absorbing member and thereafter presses the outer-edge cam surface of the first shock-absorbing member to move the first shock-absorbing member away from the shock-absorbing stand-by position thereof, and subsequently, the first shock-absorbing member returns to the shock-absorbing stand-by position thereof to thereby move the pressing portion to a position opposed to a second inclined cam surface of the pair of inclined cam surfaces of the first shock-absorbing member upon the movable mirror rotating to the viewfinder light-guiding position. When the movable mirror rotates from the viewfinder light-guiding position to the retracted position, the pressing portion presses a first inclined cam surface of the pair of inclined cam surfaces of the second shock-absorbing member and thereafter presses the outer-edge cam surface of the second shock-absorbing member to move the second shock-absorbing member away from the shock-absorbing stand-by position thereof, and subsequently, the second shock-absorbing member returns to the shock-absorbing stand-by position thereof to thereby move the pressing portion to a position opposed to a second inclined cam surface of the pair of inclined cam surfaces of the second shock-absorbing member upon the movable mirror rotating to the retracted position. It is desirable for the second inclined cam surface to be formed on an edge of the surface that is positioned farther from the rotational axis of the movable mirror than that of the first inclined cam surface.

It is desirable for the movable mirror to be supported and held by a mirror support member, and for the pressing portion to include a rotational contact portion which is provided on a side of the mirror support member to be rotatable about an axis parallel to the rotational axis of the movable mirror.

It is desirable for the pressing portion to be fixed to a support of the movable member which rotates integrally with the movable member.

It is desirable for the camera to include a mirror box which accommodates and supports the movable mirror, wherein the first shock-absorbing member and the second shock-absorbing member are supported on one side of the mirror box.

It is desirable for the rotational contact portion to be a roller.

It is desirable for the first shock-absorbing member to be supported to be linearly movable in a direction orthogonal to a rotational path of the movable mirror.

In an embodiment, a movable mirror shock-absorbing mechanism of a camera is provided, including a movable mirror which is supported to be rotatable between a viewfinder light-guiding position, in which the movable mirror is positioned in a photographing optical path to reflect incident light emanated from an object toward a viewfinder optical system of the camera, and a retracted position, in which the movable mirror is retracted from the photographing optical path to allow the object-emanated light to travel toward a photographic light-receiving medium; a mirror follower which includes a first press-receiving portion and a second press-receiving portion that are pressed by the movable mirror when the movable mirror rotates toward the viewfinder light-guiding position and the retracted position, respectively, which moves with the rotation of the movable mirror by either of the first press-receiving portion and the second press-receiving portion being pressed by the movable mirror, and which includes space for idle rotation of the movable mirror that is formed between the first press-receiving portion and the second press-receiving portion to allow the movable mirror to rotate without making the movable mirror contact either of the first press-receiving portion and the second press-receiving portion; and a shock-absorbing member which absorbs shock of the movable mirror by being pressed by the mirror follower moving with rotation of the movable mirror. When the movable mirror rotates from one of the retracted position and the viewfinder light-guiding position toward the other of the retracted position and the viewfinder light-guiding position, the movable mirror rotates without pressing the mirror follower during an initial rotation of the movable mirror, due to the space for idle rotation of the movable mirror, and subsequently rotates while pressing the mirror follower.

It is desirable for the shock-absorbing member to be held by a biaser at a shock-absorbing stand-by position at which the shock-absorbing member lies in a rotational path of the mirror follower, and moves against a biasing force of the biaser when pressed by the mirror follower.

It is desirable for the shock-absorbing member to be supported to be movable linearly in a direction intersecting the rotational path of the mirror follower, and the shock-absorbing member to be biased in a biasing direction away from a rotational axis of the movable mirror by the biaser to be held at the shock-absorbing stand-by position. The shock-absorbing member includes an outer-edge cam surface which is positioned on an outer edge of the shock-absorbing member that is farthest from the rotational axis of the movable mirror; and a pair of inclined cam surfaces which are connected to opposite ends of the outer-edge cam surface, respectively, and wherein each of the pair of inclined cam surfaces is inclined toward the rotational axis of the movable mirror in a direction away from the outer-edge cam surface. The outer-edge cam surface and the pair of inclined cam surfaces are positioned in the rotational path of the mirror follower when the shock-absorbing member is held at the shock-absorbing stand-by positions thereof. During rotation of the movable mirror between the retracted position and the viewfinder light-guiding position, the mirror follower presses a first inclined cam surface of the pair of inclined cam surfaces of the shock-absorbing member and thereafter presses the outer-edge cam surface of the shock-absorbing member to move the shock-absorbing member away from the shock-absorbing stand-by position thereof, and subsequently, the shock-absorbing member returns to the shock-absorbing stand-by position thereof to thereby move the mirror follower to a position opposed to a second inclined cam surface of the pair of inclined cam surfaces of the shock-absorbing member upon the movable mirror rotating to one of the retracted position and the viewfinder light-guiding position. The second inclined cam surface is formed on an edge, of the shock-absorbing member, that is positioned farther from the rotational axis of the movable mirror than that of the first inclined cam surface.

It is desirable for the camera to include a mirror box which supports the movable mirror, wherein a guide hole which extends along a rotational path of the movable mirror is formed in the mirror box, and each of the first press-receiving portion and the second press-receiving portion of the mirror follower comprises a projection which is slidably inserted into the guide hole.

It is desirable for the movable mirror to include a pressing projection which is positioned between the first press-receiving portion and the second press-receiving portion, wherein the pressing projection selectively presses the first press-receiving portion and the second press-receiving portion in accordance with the rotation of the movable mirror.

It is desirable for the mirror follower to include a first contact portion and a second contact portion. The shock-absorbing member includes a first shock-absorbing member which comes into contact with the first contact portion when the movable mirror is in the viewfinder light-guiding position; and a second shock-absorbing member which comes into contact with the second contact portion when the movable mirror is in the retracted position.

It is desirable for the mirror follower to include a connecting portion which connects the first contact portion and the second contact portion to each other with a space therebetween in a moving direction of the mirror follower. The first press-receiving portion and the second press-receiving portion are formed to project from the first contact portion and the second contact portion, respectively.

It is desirable for the first shock-absorbing member and the second shock-absorbing member are mutually identical in specifications.

It is desirable for the camera to include a mirror box which accommodates and supports the movable mirror, and for the shock-absorbing member to be supported on one side of the mirror box.

It is desirable for the mirror follower to be elongated along the guide hole.

Since the movable mirror shock-absorbing mechanism according to an aspect of the present invention is equipped with the first shock-absorbing member, which absorbs shock of the movable mirror when the movable mirror rotates from the retracted position to the viewfinder light-guiding position, and the second shock-absorbing member, which absorbs shock of the movable mirror when the movable mirror rotates from the viewfinder light-guiding position to the retracted position, bounce of the movable mirror can be suppressed at each of the viewfinder light-guiding position and the retracted position, which makes it possible to achieve an improvement in continuous photographing capability. In addition, simplification in structure of the movable mirror shock-absorbing mechanism and reduction in production cost thereof are both achieved because the first shock-absorbing member and the second shock-absorbing member are made to be mutually identical in specification.

Additionally, since the movable mirror shock-absorbing mechanism according to another aspect of the present invention is structured such that the movable mirror presses the mirror follower after passing a predetermined idle clearance and thereupon presses the first shock-absorbing member or the second shock-absorbing member via the mirror follower when the movable mirror rotates from the viewfinder light-guiding position (mirror-down position) toward the retracted position (mirror-up position) or from the retracted position (mirror-up position) toward the viewfinder light-guiding position (mirror-down position), no load of either shock-absorbing member acts on the movable mirror at an initial stage of the rotation of the movable mirror, which makes it possible to improve the continuous photographing capability.

The present disclosure relates to subject matter contained in Japanese Patent Applications Nos. 2011-260684 and 2011-260685 (both filed on Nov. 29, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE EMBODIMENTS

Figure 1:
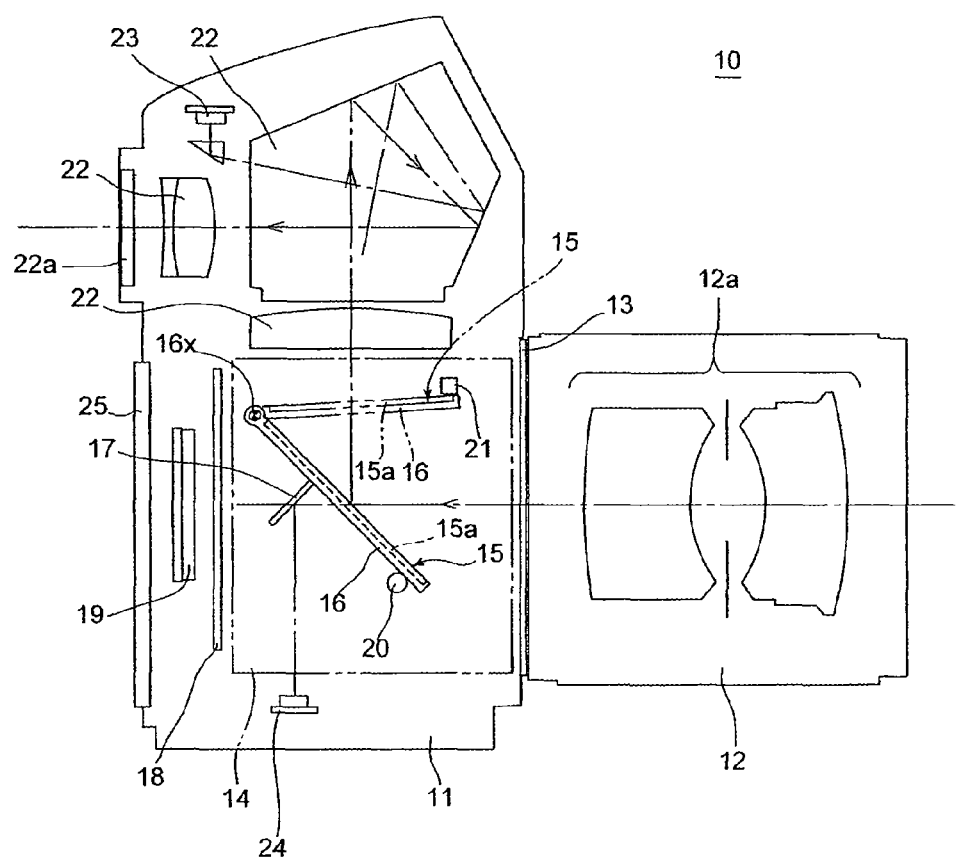
FIG. 1 is a diagram showing a schematic representation of the optical system of an SLR camera according to the present invention.
Figure 2:
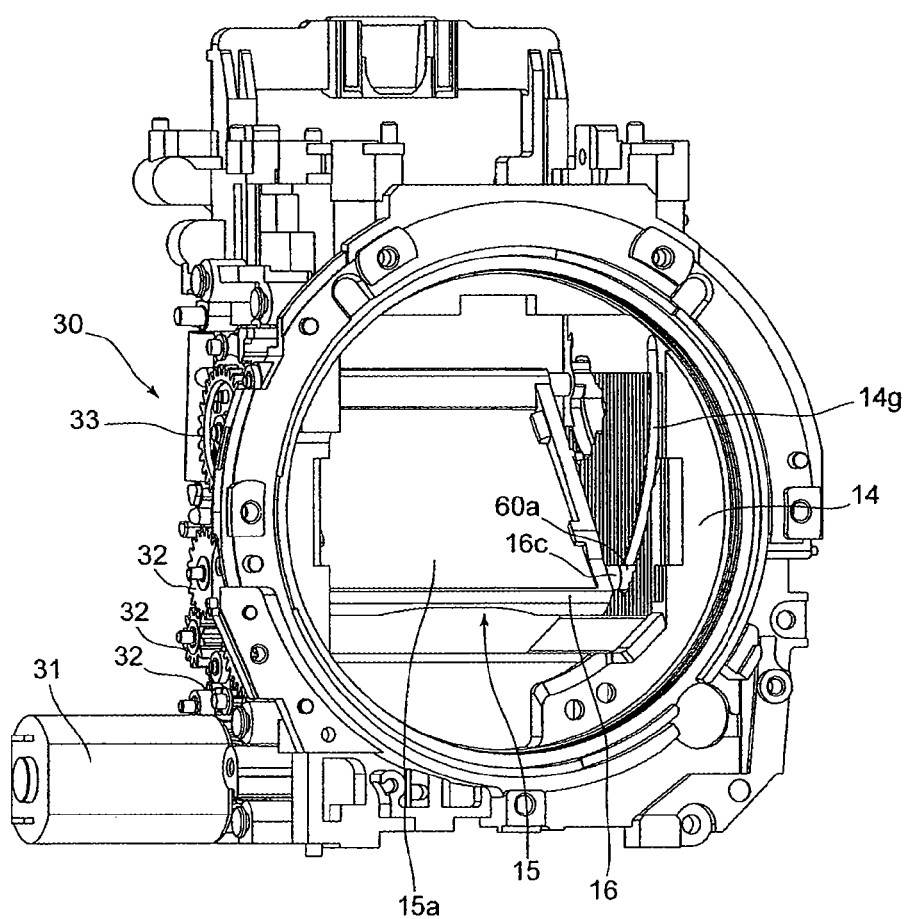
FIG. 2 is a front perspective view of a mirror box unit of the camera which is equipped with a mirror shock-absorbing mechanism according to a first embodiment, showing the mirror box unit in a mirror-down state.

The following descriptions include descriptions of two (first and second) embodiments of a movable mirror shock-absorbing mechanism (mirror shock-absorbing mechanism). First, the first embodiment of the mirror shock-absorbing mechanism will be hereinafter discussed with reference to FIGS. 1 through 16. An SLR camera (hereinafter referred simply to as camera) 10 shown in FIG. 1 is provided on the front of a camera body 11 with a lens mount 13, to which an interchangeable lens 12 is detachably attached. The camera 10 is provided, in the camera body 11 behind the lens mount 13, with a mirror box 14.

The camera 10 is provided inside the mirror box 14 with a movable mirror (quick-return mirror) 15. The movable mirror 15 is constructed such that a main mirror 15a is fixedly supported on a mirror seat 16, and a sub-mirror 17 is positioned behind the mirror seat 16 and rotatably supported by the mirror seat 16. A pair of mirror seat hinges (coaxial hinges) 16x which project in laterally opposite directions from both sides of the mirror seat 16 are rotatably supported by both side walls of the mirror box 14, respectively. The camera 10 is provided behind the movable mirror 15 with a focal plane shutter (hereinafter referred simply to as shutter) 18, and is provided behind the shutter 18 with an image sensor (photographic light-receiving medium) 19. The present embodiment of the camera 10 is a digital camera using the image sensor 19 as a photographic light-receiving medium; however, the present invention can also be applied to a camera using silver-salt film as a photographic light-receiving medium.

The movable mirror 15 reciprocatively rotates (swings) about the pair of mirror seat hinges 16x between a mirror-down position (viewfinder light-guiding position; shown by solid lines in FIG. 1 and also shown in FIGS. 2, 4, 5 and 10), in which the movable mirror 15 is positioned in a photographing optical path which extends from a photographing lens system 12a provided in the interchangeable lens 12 to the image sensor 19, to be inclined at an angle of approximately 45 degrees with respect to the photographing optical path, and a mirror-up position (retracted position; shown by one-dot chain lines in FIG. 1 and also shown in FIGS. 3, 6 and 13), in which the movable mirror 15 is retracted upward from the photographing optical path. As shown in FIGS. 4 and 6, a mirror-down position defining pin 20 projects inside the mirror box 14 from an inner surface of one of the side walls of the mirror box 14 that are positioned on laterally both sides of the movable mirror 15, and the mirror-down position of the movable mirror 15 is defined by engagement of the mirror-down position defining pin 20 with a stopper 16a (see FIGS. 7 and 8) formed on a side of the mirror seat 16. The installation position of the mirror-down position defining pin 20 to the mirror box 14 can be finely adjusted. In addition, an upper stopper 21 is fixedly installed inside the mirror box 14. An upper surface of the mirror seat 16 comes into contact with the upper stopper 21 when the movable mirror 15 rotates to the mirror-up position. The camera 10 is provided therein, above the movable mirror 15, with a viewfinder optical system 22 that is configured of a pentagonal prism, an eyepiece lens and other optical elements.

Object-emanated light which enters the mirror box 19 through the photographing lens system 12a in the interchangeable lens 12, with the interchangeable lens 12 mounted to the lens mount 13, is reflected by the main mirror 15a of the movable mirror 15 to be incident on the viewfinder optical system 22 and observable through a viewfinder window 22a formed in the back of the camera body 11. In this state, a photometering operation using a photometering unit 23 which is installed behind the pentagonal prism of the viewfinder optical system 22 can be carried out. In addition, when the movable mirror 15 is in the mirror-down position, the sub-mirror 17 projects obliquely downwards from the underside of the mirror seat 16 to reflect part of the object-emanated light downward to be incident on a distance measuring unit 24, which makes it possible to detect an object distance. On the other hand, when the movable mirror 15 is in the mirror-up position, the object-emanated light which enters the mirror box 19 through the photographing lens system 12a travels toward the shutter 18 without being reflected by the movable mirror 15, thus being capable of being made incident on the light receiving surface of the image sensor 19 by opening the shutter 18. When the movable mirror 15 is in the mirror-up position, the sub-mirror 17 is retracted at the underside of the mirror seat 16. Electronic object images obtained via the image sensor 19 and various other information can be displayed on an LCD monitor 25 provided on the back of the camera body 11.

Figure 3:
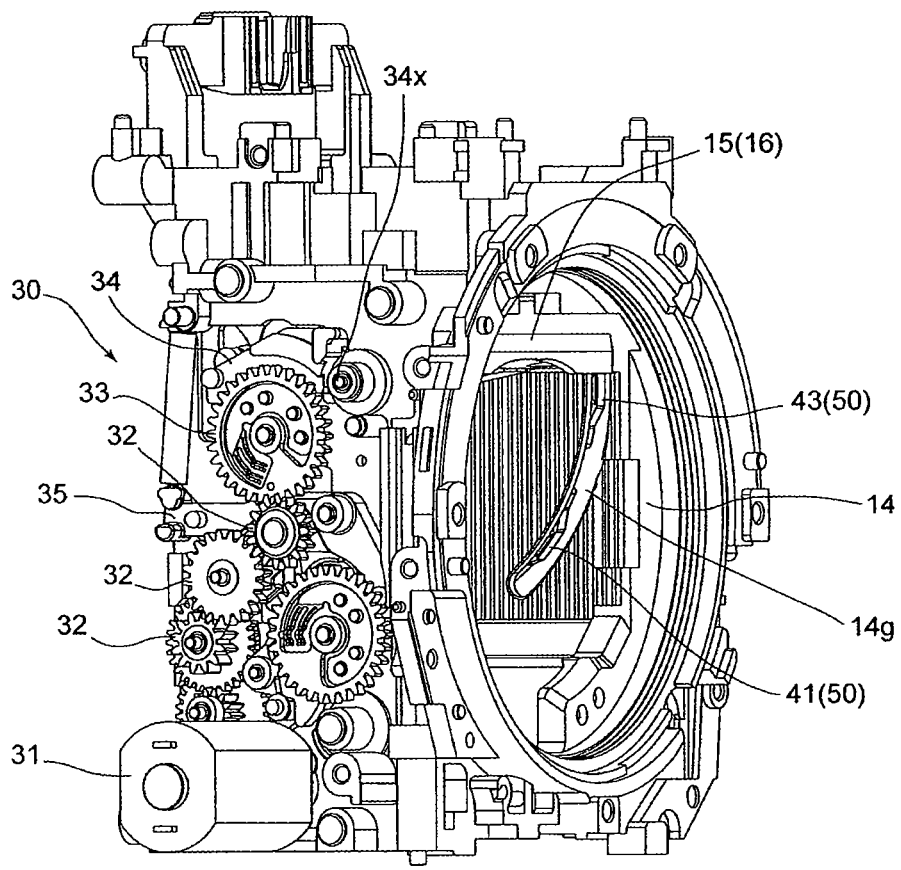
FIG. 3 is a front perspective view of the mirror box unit of the camera, which is equipped with the first embodiment of the mirror shock-absorbing mechanism, showing the mirror box unit in a mirror-up state.
Figure 4:
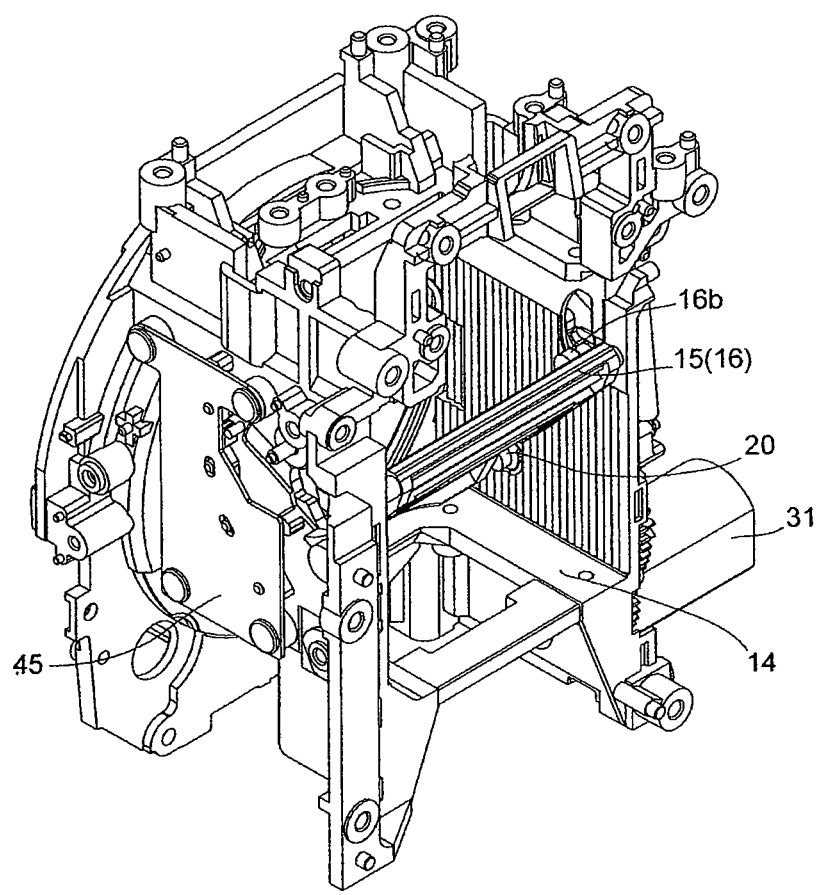
FIG. 4 is a rear perspective view of the mirror box unit of the camera, which is equipped with the first embodiment of the mirror shock-absorbing mechanism, showing the mirror box unit in the mirror-down state.
Figure 5:
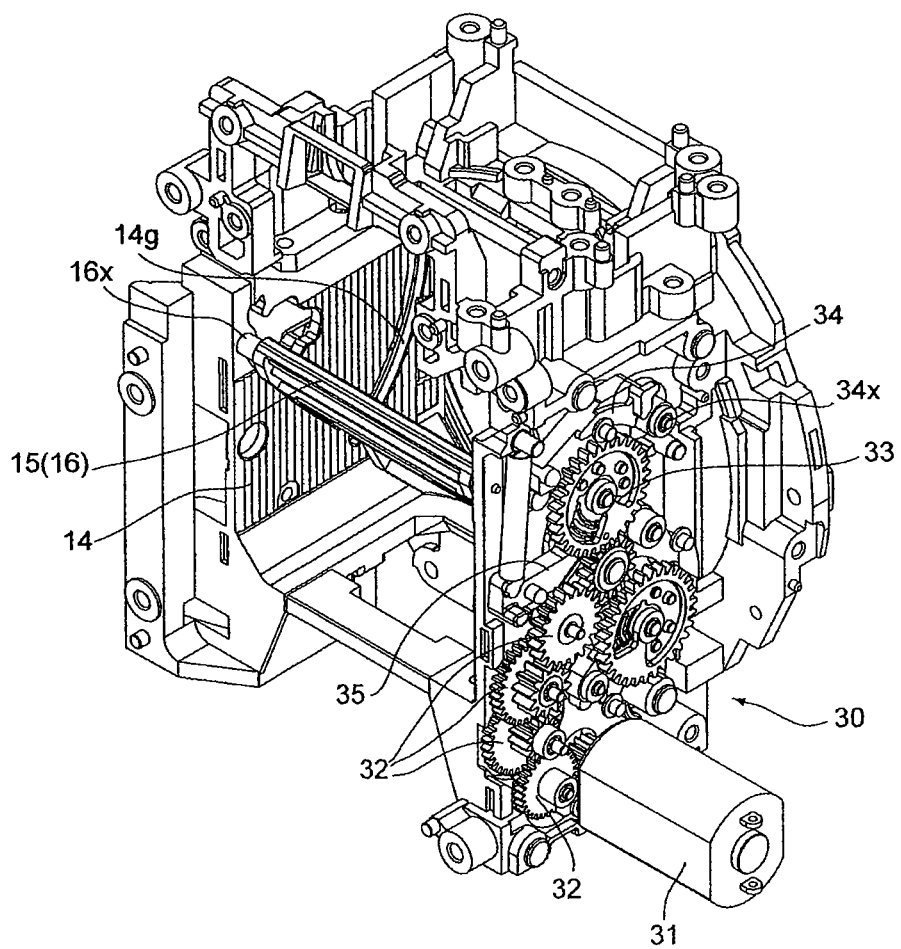
FIG. 5 is a rear perspective view of the mirror box unit of the camera, which is equipped with the mirror shock-absorbing mechanism according to the first embodiment, showing the mirror box unit in the mirror-down state.
Figure 6:
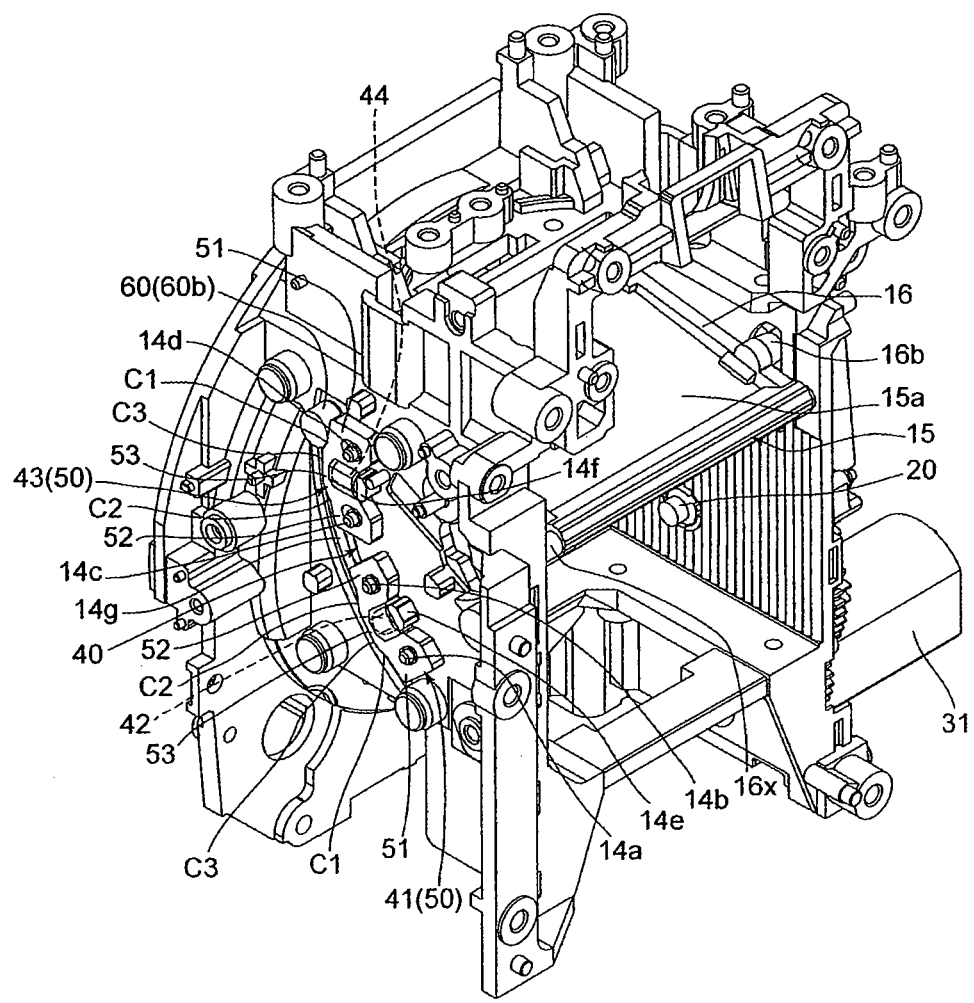
FIG. 6 is a rear perspective view of the mirror box unit of the camera, which is equipped with the mirror shock-absorbing mechanism according to the first embodiment, showing the mirror box unit in the mirror-up state.

As shown in FIGS. 3 and 5, the camera 10 is provided with a mirror drive mechanism 30, on a side (left side as viewed from front) of the mirror box 14, which drives the movable mirror 15 to rotate the movable mirror 15 up and down. The mirror drive mechanism 30 is provided with a motor 31, a reduction gear train 32 which transmits a driving force of the motor 31, a cam gear 33 to which the rotational driving force is transmitted from the reduction gear train 32 via a planetary gear mechanism, and a mirror drive lever 34, the rotational position of which is controlled by the cam gear 33. The mirror drive lever 34 is supported by the mirror box 14 to be reciprocatively rotatable (swingable) about an axis 34x which is substantially parallel to the axis of the pair of mirror seat hinges 16x. The mirror drive lever 34 holds a mirror seat boss 16b which is formed on a side of the mirror seat 16. Pressing the mirror seat boss 16b downward by a holding portion of the mirror drive lever 34 which holds the mirror seat boss 16b causes the movable mirror 15 to rotate downward, toward the mirror-down position, and pressing the mirror seat boss 16b upward by the same holding portion causes the movable mirror 15 to rotate upward, toward the mirror-up position. The mirror drive lever 34 is biased to rotate in a direction to press the movable mirror 15 toward the mirror-down position. When the cam gear 33 is located at a specific rotational position, the mirror drive lever 34 is pressed and rotated toward the mirror-up position against the biasing force by a mirror control cam (peripheral surface cam) formed on the cam gear 33. More specifically, the cam gear 33 is a single-rotation cam gear which is rotated only in one direction from an initial position. When the cam gear 33 is in the initial position, the mirror control cam of the cam gear 33 does not press the mirror drive lever 34, so that the movable mirror 15 is held in the mirror-down position by a biasing force which acts on the mirror drive lever 34. A rotation of the cam gear 33 partway from the initial position causes the mirror control cam of the cam gear 33 to press and rotate the mirror drive lever 34, which causes the mirror drive lever 34 to rotate the movable mirror 15 to the mirror-up position. During the time the cam gear 33 returns to the initial position from this partway position, the mirror control cam of the cam gear 33 releases the pressure against the mirror drive lever 34, so that the movable mirror 15 returns to the mirror-down position.

The camera 10 is provided on the left side of the mirror box 14, to which the mirror drive mechanism 30 is installed, with a shutter charge lever 35 which makes the shutter 18 perform a shutter charge operation. In addition to the aforementioned mirror control cam, the cam gear 33 is further provided with a shutter charge cam for controlling the operation of the shutter charge lever 35. One rotation of the cam gear 33 from the initial position causes the shutter charge lever 35 to reciprocatively rotate to make the shutter 18 perform the shutter charge operation. The shutter charge operation is not related to the features of the present invention, and therefore the detailed description of the shutter charge operation is omitted in the following description.

Figure 9:
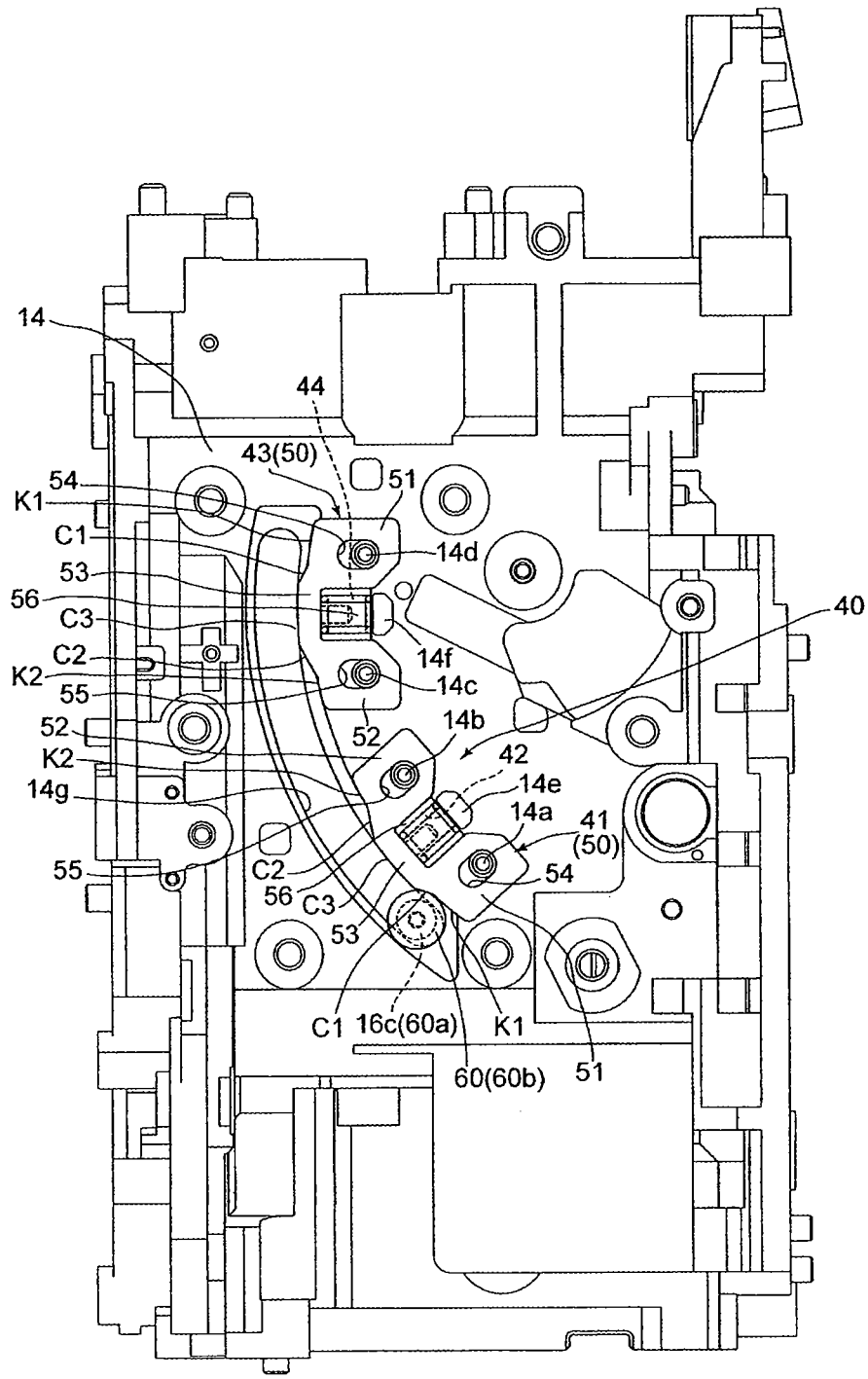
FIG. 9 is a left side elevational view of the first embodiment of the mirror box unit with a retaining plate removed to expose the mirror shock-absorbing mechanism.

The camera 10 is provided on the other side of the mirror box 14 (the right side of the mirror box 14 as viewed from the front) with a mirror shock-absorbing mechanism 40 which absorbs shock of the movable mirror 15 that is caused upon rotation of the movable mirror 15 to the mirror-down position or the mirror-up position to reduce bouncing (vibration) of the movable mirror 15. The mirror shock-absorbing mechanism 40 is provided with a mirror-down shock-absorbing member (first shock-absorbing member) 41, a mirror-down shock-absorbing spring (biaser) 42, a mirror-up shock-absorbing member (second shock-absorbing member) 43 and a mirror-up shock-absorbing spring (biaser) 44. The mirror-down shock-absorbing member 41, the mirror-down shock-absorbing spring 42, the mirror-up shock-absorbing member 43 and the mirror-up shock-absorbing spring 44 are held so as not to come off the mirror box 14 by a retaining plate 45 (see FIG. 4) fixed to a side of the mirror box 14. FIGS. 6 and 9 each show a state where the retaining plate 45 is removed for clarity.

Figure 16:
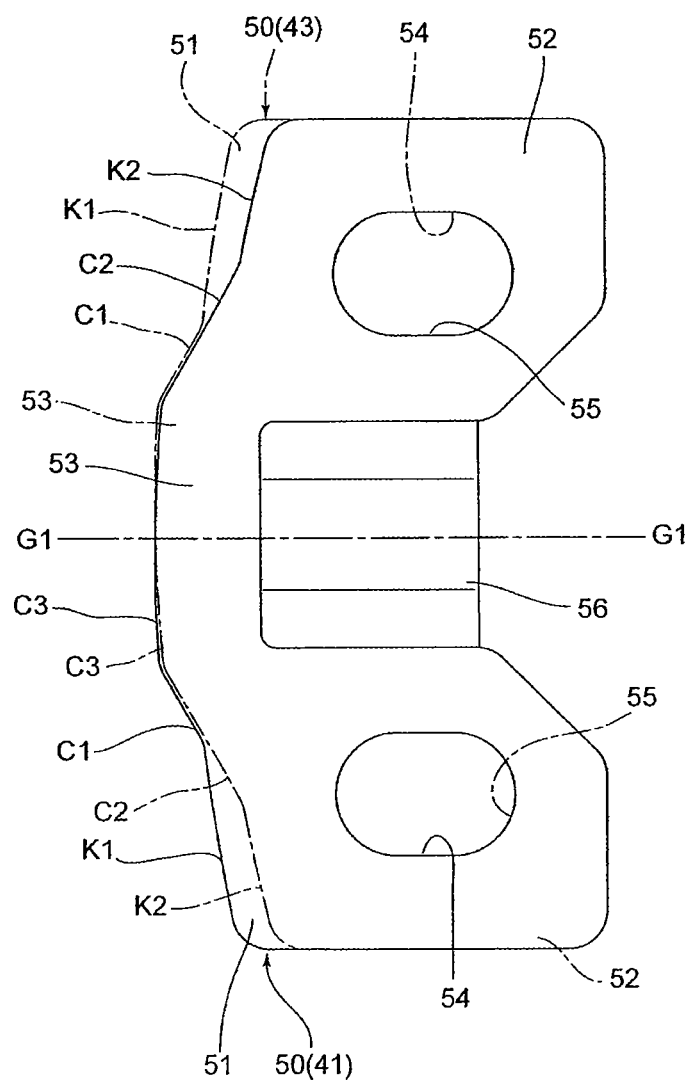
FIG. 16 is a plan view of two slide members having the same specifications which constitute the mirror-down shock-absorbing member and the mirror-up shock-absorbing member, respectively, showing the two slide members in a state where the two slide members are overlaid on each other with the front of one of the two slide members and the back of the other slide member opposed to each other.

The mirror-down shock-absorbing member 41 absorbs shock of the movable mirror 15 and suppresses bounce of the movable mirror 15 when the movable mirror 15 rotates to the mirror-down position, and the mirror-up shock-absorbing member 43 absorbs shock of the movable mirror 15 and suppresses bounce of the movable mirror 15 when the movable mirror 15 rotates to the mirror-up position. Two slide members 50 having the same specifications are provided as the mirror-down shock-absorbing member 41 and the mirror-up shock-absorbing member 43, respectively; namely, the mirror-down shock-absorbing member 41 and the mirror-up shock-absorbing member 43 have mutually identical specifications. The two slide members 50 are used as the mirror-down shock-absorbing member 41 and the mirror-up shock-absorbing member 43, respectively, by being installed onto the mirror box 14 with the front (or back) of one of the two slide members 50 and the front (or back) of the other slide member 50 facing mutually opposite directions. As shown in FIG. 16, each slide member 50 is provided with a pair of wing-shaped portions 51 and 52 and a middle bridge portion 53 and has a shape such that the pair of wing-shaped portions 51 and 52 are bridged with the middle bridge portion 53. A pair of guide holes 54 and 55 are formed in the pair of wing-shaped portions 51 and 52, respectively. The guide holes 54 and 55 are elongated in parallel directions with each other. The middle bridge portion 53 is provided with a spring accommodating portion 56. A cylindrical accommodation space which is open at one end thereof is formed in the spring accommodating portion 56, and the middle bridge portion 53 is provided in this accommodation space with a spring support projection 57.

Each slide member 50 is provided with a first cam surface (inclined cam surface) C1, a second cam surface (inclined cam surface) C2 and a third cam surface (outer-edge cam surface) C3 which are formed on the outer edge on a side thereof which is farthermost from the axis of the pair of mirror seat hinges 16x in an installed state (which will be discussed later) of the slide member 50 to the mirror box 14. In the following descriptions, in an installed state of the slide member 50 to the mirror box 14, the farthermost side of each slide member 50 from the axis of the pair of mirror seat hinges 16x (the left-hand side with respect to FIG. 10) is referred to as the radially outer side, and the nearest side of each slide member 50 to the axis of the pair of mirror seat hinges 16x (the right-hand side with respect to FIG. 10) is referred to as the radially inner side. The first cam surface C1, the second cam surface C2 and the third cam surface C3 of each slide member 50 are formed as a radially outer edge of the wing-shaped portion 51, a radially outer edge of the wing-shaped portion 52 and a radially outer edge of the middle bridge portion 53, respectively. The third cam surface C3 is at the radially outermost side, while each of the first cam surface C1 and the second cam surface C2 is a cam surface which includes a component of inclination that extends toward the radially inner side in a direction away from the third cam surface C3. In addition, the wing-shaped portion 51 is provided, on an area of the radially outer edge thereof which ranges from the first cam surface C1 to an external edge (upper edge with respect to FIG. 10) of the wing-shaped portion 51, with a gently inclined surface k1 whose angle of inclination toward the radially inner side is smaller than the first cam surface C1, and the wing-shaped portion 52 is provided, on an area of the radially outer edge thereof which ranges from the second cam surface C2 to an external edge (lower edge with respect to FIG. 10) of the wing-shaped portion 52, with a gently inclined surface k2 whose angle of inclination toward the radially inner side is smaller than the second cam surface C2.

The radially outside edge of each slide member 50, on which the cam surfaces C1, C2 and C3 and the gentle inclined surfaces k1 and k2 are formed, has an asymmetrical shape with respect to an imaginary center line G1 (see FIGS. 10 and 16) which passes through the lateral center of the slide member 50 and which is parallel to the linear moving direction of the slide member 50 (the mirror-down shock-absorbing member 41 or the mirror-up shock-absorbing member 43). As can be seen from FIG. 16, which shows the two slide members 50 in a mutually overlaid state with the front of one of the two slide members 50 and the back of the other slide member 50 opposed to each other, the first cam surface C1 and the second cam surface C2 of each slide member 50 are asymmetrical to the imaginary center line G1 thereof and also the gently inclined surface k1 and the gently inclined surface k2 of each slide member 50 are asymmetrical to the imaginary center line G1 thereof. In addition, opposite sides of the third cam surface C3 with respect to the imaginary center line G1 are asymmetrical to the imaginary center line G1 thereof. The third cam surface C3 is formed so that a portion thereof at the boundary between the third cam surface C3 and the first cam surface C1 is slightly greater in amount of projection toward the radially outer side than the other portion of the third cam surface C3 at the boundary between the third cam surface C3 and the second cam surface C2; in addition, the third cam surface C3 is formed to extend toward the radially inner side gently in a direction toward the second cam surface C2 from the first cam surface C1 side. The second cam surface C2, which is continuous with one end of the third cam surface C3, is formed to be greater in length in a direction toward the radially inner side than the first cam surface C1, which is continuous with the other end of the third cam surface C3, and the gently inclined surface k2 is positioned closer to the radially inner side than the gently inclined surface k1 correspondingly.

The mirror box 14 is provided on a side thereof with four guide pins, specifically, two pairs of guide pins 14a and 14b, and 14c and 14d, that are arranged at predetermined intervals along the rotational direction of the movable mirror 15 about the axis (of rotation) of the pair of mirror seat hinges 16x. The four guide pins 14a, 14b, 14c and 14d are mutually identical in radial distance to the axis of the pair of mirror seat hinges 16x. In addition, the distance between the pair of guide pins 14a and 14b and the distance between the pair of guide pins 14c and 14d in the rotational direction of the movable mirror 15 are identical to each other and correspond to the distance between the pair of guide holes 54 and 55 of the mirror-down shock-absorbing member 41 and the pair of guide holes 54 and 55 of the mirror-up shock-absorbing member 43, respectively. The mirror box 14 is provided, on a side thereof between the guide pins 14a and 14b and between the guide pins 14c and 14d, with a spring support projection 14e and a spring support projection 14f, respectively.

The slide member 50 to be used as the mirror-down shock-absorbing member 41 is installed onto the mirror box 14 by inserting the pair of guide pins 14a and 14b into the pair of guide holes 54 and 55, respectively, so that the cam surfaces C1, C2 and C3 face toward the radially outer side that is farthest from the axis of the pair of mirror seat hinges 16x. On the other hand, the slide member 50 to be used as the mirror-up shock-absorbing member 43 is installed onto the mirror box 14 by inserting the pair of guide pins 14c and 14d into the pair of guide holes 55 and 54, respectively, so that the cam surfaces C1, C2 and C3 face toward the radially outer side that is farthest from the axis of the pair of mirror seat hinges 16x. Namely, the arrangement of the mirror-down shock-absorbing member 41 and the mirror-up shock-absorbing member 43 is such that two of the slide members 50 that have the same specifications are supported on one side of the mirror box 14 with front/back sides of the two slide members 50 being reversely arranged and with the wing-shaped portions 52 of the two slide members 50 facing each other in the rotational direction of the movable mirror 15.

The mirror-down shock-absorbing member 41 is supported by engagement of the pair of guide pins 14a and 14b with the pair of guide holes 54 and 55, with the pair of guide holes 54 and 55 guided by the pair of guide pins 14a and 14b to be movable linearly in a radial direction of the movable mirror 15 with respect to (toward/away from) the axis of the pair of mirror seat hinges 16x in a plane orthogonal to this axis. The moving direction of the mirror-down shock-absorbing member 41 is set obliquely downward/upward with respect to the horizontal direction in a state where the camera 10 is held horizontally. In other words, the moving direction of the mirror-down shock-absorbing member 41 intersects the rotational path of the movable mirror 15 at an orthogonal direction thereto.

The mirror-down shock-absorbing spring 42 is inserted into the aforementioned cylindrical accommodation space in the spring accommodating portion 56 of the mirror-down shock-absorbing member 41. The cylindrical accommodation space in the spring accommodating portion 56 is open to the radially inner side that is on the opposite side from the third cam surface C3. The mirror-down shock-absorbing spring 42 is a compression coil spring and is accommodated in the cylindrical accommodation space with one end thereof in contact with the bottom of the cylindrical accommodation space in the spring accommodating portion 56 and with the other end exposed to the opening of this cylindrical accommodation space. The exposed end of the mirror-down shock-absorbing spring 42 of the mirror-down shock-absorbing member 41 comes in contact with the spring support projection 14*e* when the mirror-down shock-absorbing member 41 is installed onto the mirror box 14 to be supported thereby. The mirror-down shock-absorbing spring 42 is prevented from buckling by the inner peripheral surface of the cylindrical accommodation space in the spring accommodating portion 56 and the spring support projection 57 and is capable of being expanded and contracted in the axial direction. The mirror-down shock-absorbing spring 42 is compressed in an installed state of the mirror-down shock-absorbing member 41 shown in FIGS. 9 through 15, and the resilient force of the mirror-down shock-absorbing spring 42 biases the mirror-down shock-absorbing member 41 toward the radially outer side, i.e., in a direction away from the axis of the pair of mirror seat hinges 16*x*. The mirror-down shock-absorbing member 41 is prevented from moving in the biasing direction of the mirror-down shock-absorbing spring 42 by engagement of one end of the pair of guide holes 54 and 55 with the pair of guide pins 14*a* and 14*b*, respectively. The limit of movement of the mirror-down shock-absorbing member 41 in this biasing direction corresponds to a shock-absorbing stand-by position of the mirror-down shock-absorbing member 41.

Similar to the mirror-down shock-absorbing member 41, the mirror-up shock-absorbing member 43 is supported by engagement of the pair of guide pins 14*d* and 14*c* with the pair of guide holes 54 and 55, with the pair of guide holes 54 and 55 guided by the pair of guide pins 14*d* and 14*c* to be movable linearly in a radial direction of the movable mirror with respect to (toward/away from) the axis of the pair of mirror seat hinges 16*x* in a plane orthogonal to this axis. The moving direction of the mirror-up shock-absorbing member 43 is set substantially horizontal in a state where the camera 10 is held horizontally. In other words, the moving direction of the mirror-up shock-absorbing member 43 intersects the rotational path of the movable mirror 15 at an orthogonal direction thereto.

The mirror-up shock-absorbing spring 44 is inserted into the aforementioned cylindrical accommodation space in the spring accommodating portion 56 of the mirror-up shock-absorbing member 43. The mirror-up shock-absorbing spring 44 is a compression coil spring identical in specifications to the mirror-down shock-absorbing spring 42 and is accommodated in the cylindrical accommodation space with one end of the mirror-up shock-absorbing spring 44 in contact with the bottom of the cylindrical accommodation space in the spring accommodating portion 56 and with the other end exposed to the opening of this cylindrical accommodation space. The exposed end of the mirror-up shock-absorbing spring 44 of the mirror-up shock-absorbing member 43 comes in contact with the spring support projection 14*f* when the mirror-up shock-absorbing member 43 is installed onto the mirror box 14 to be supported thereby. The mirror-up shock-absorbing spring 44 is prevented from buckling by the inner peripheral surface of the cylindrical accommodation space in the spring accommodating portion 56 and the spring support projection 57 and is capable of being expanded and contracted in the axial direction. The mirror-up shock-absorbing spring 44 is compressed in an installed state of the mirror-up shock-absorbing member 43 shown in FIGS. 9 through 15, and the resilient force of the mirror-up shock-absorbing spring 44 biases the mirror-up shock-absorbing member 43 toward the radially outer side, i.e., in a direction away from the axis of the pair of mirror seat hinges 16*x*. The mirror-up shock-absorbing member 43 is prevented from moving in the biasing direction of the mirror-up shock-absorbing spring 44 by engagement of one end of the pair of guide holes 54 and 55 with the pair of guide pins 14*d* and 14*c*, respectively. The limit of movement of the mirror-up shock-absorbing member 43 in this biasing direction corresponds to a shock-absorbing stand-by position of the mirror-up shock-absorbing member 43.

Figure 7:
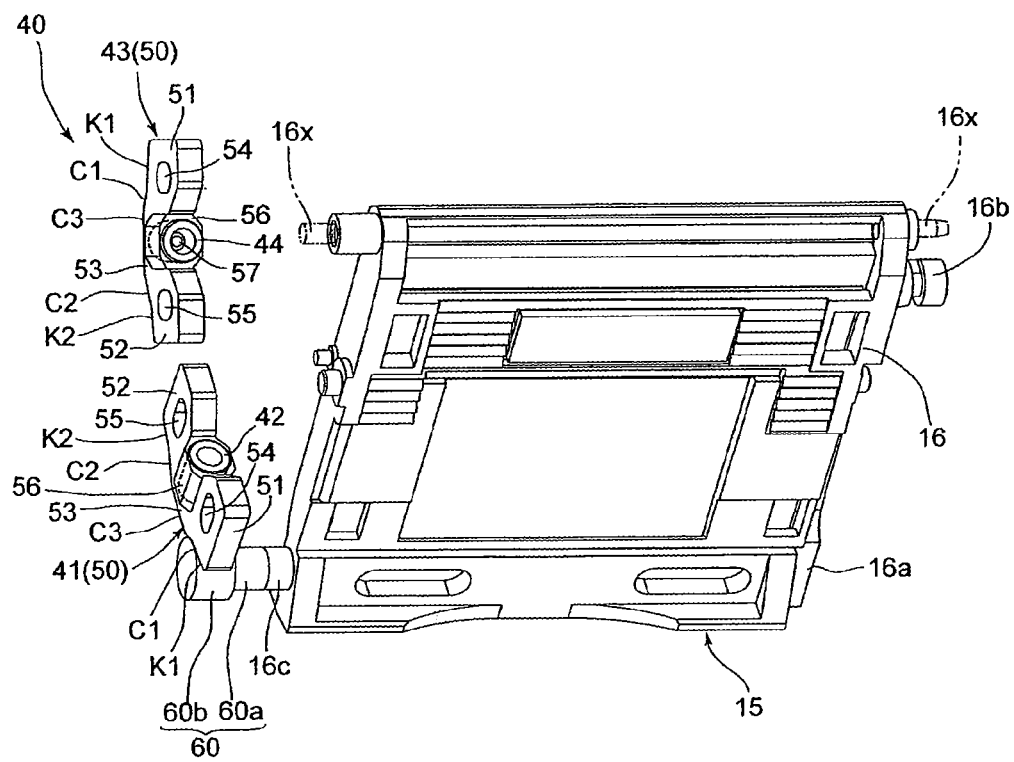
FIG. 7 is a rear perspective view of the mirror shock-absorbing mechanism according to the first embodiment, showing a state where a contact portion of a mirror seat is in contact with a mirror-down shock-absorbing member.
Figure 8:
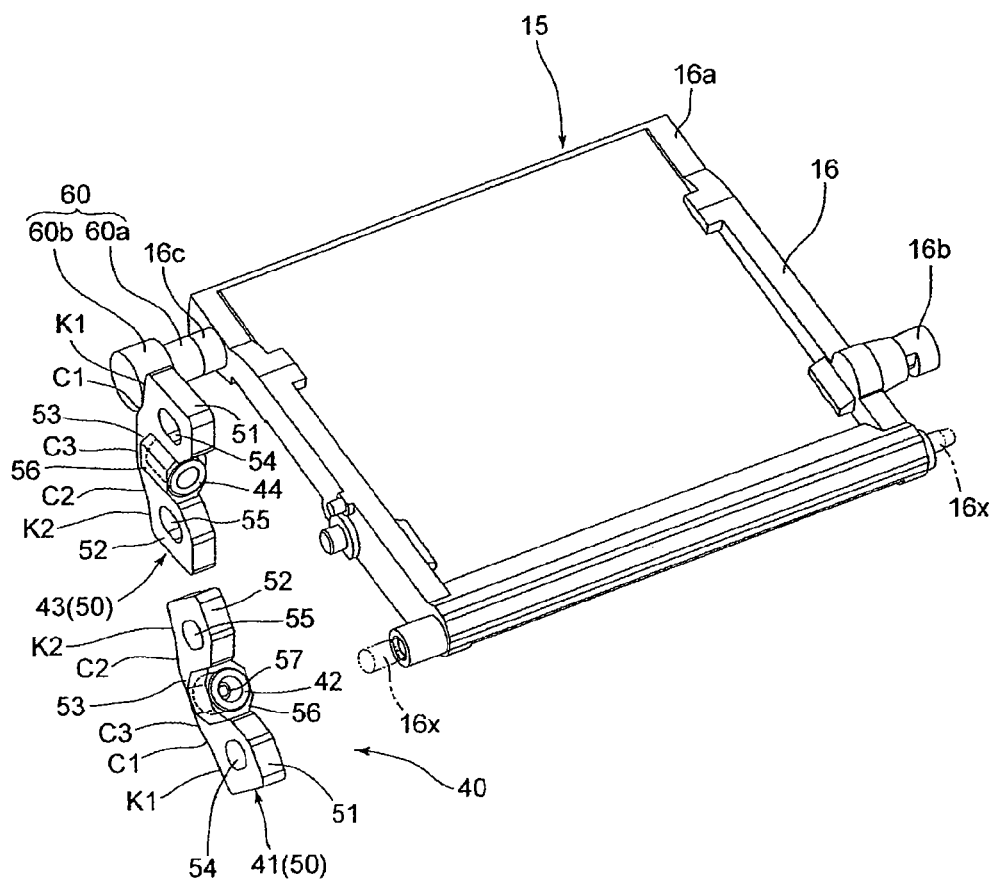
FIG. 8 is a rear perspective view of the first embodiment of the mirror shock-absorbing mechanism, showing a state where the contact portion of the mirror seat is in contact with a mirror-up shock-absorbing member.

As shown in FIGS. 7 and 8, the mirror seat 16 is provided, on a side thereof in the vicinity of the free end of the mirror seat 16, with a base shaft 16*c* which projects in a horizontal direction, and a roller (pressing portion/rotational contact portion) 60 is supported on the base shaft 16*c*. The roller 60 is provided with a small-diameter portion 60*a* which is identical in diameter to the base shaft 16*c* and a large-diameter portion 60*b* which is positioned at the front end of the small-diameter portion 60*a*. The roller 60 is supported by the base shaft 16*c* to be rotatable relative to the base shaft 16*c* about an axis parallel to the axis of the pair of mirror seat hinges 16*x*. The large-diameter portion 60*b* of the roller 60 is provided with a cylindrical peripheral surface with its center on the axis of rotation of the roller 60. A through-hole 14*g* into which the base shaft 16*c* and the and the small-diameter portion 60*a* of the roller 60 are inserted is formed through a side wall of the mirror box 14. The through-hole 14*g* is an arc-shaped hole elongated along the moving path of the base shaft 16*c* and the small-diameter portion 60*a* of the roller 60 when the movable mirror 15 is rotated. When the movable mirror 15 is in the range of movement from the mirror-down position to the mirror-up position, the movable mirror 15 does not interfere with movements of the base shaft 16*c* and the small-diameter portion 60*a* of the roller 60. As shown in FIG. 6, the large-diameter portion 60*b* of the roller 60 projects from one side of the mirror box 14 with the base shaft 16*c* and the small-diameter portion 60*a* passed through the through-hole 14*g* to be contactable with the first cam surface C1, the second cam surface C2 and the third cam surface C3 of each of the mirror-down shock-absorbing member 41 and the mirror-up shock-absorbing member 43 in accordance with rotation of the movable mirror 15.

Figure 10:
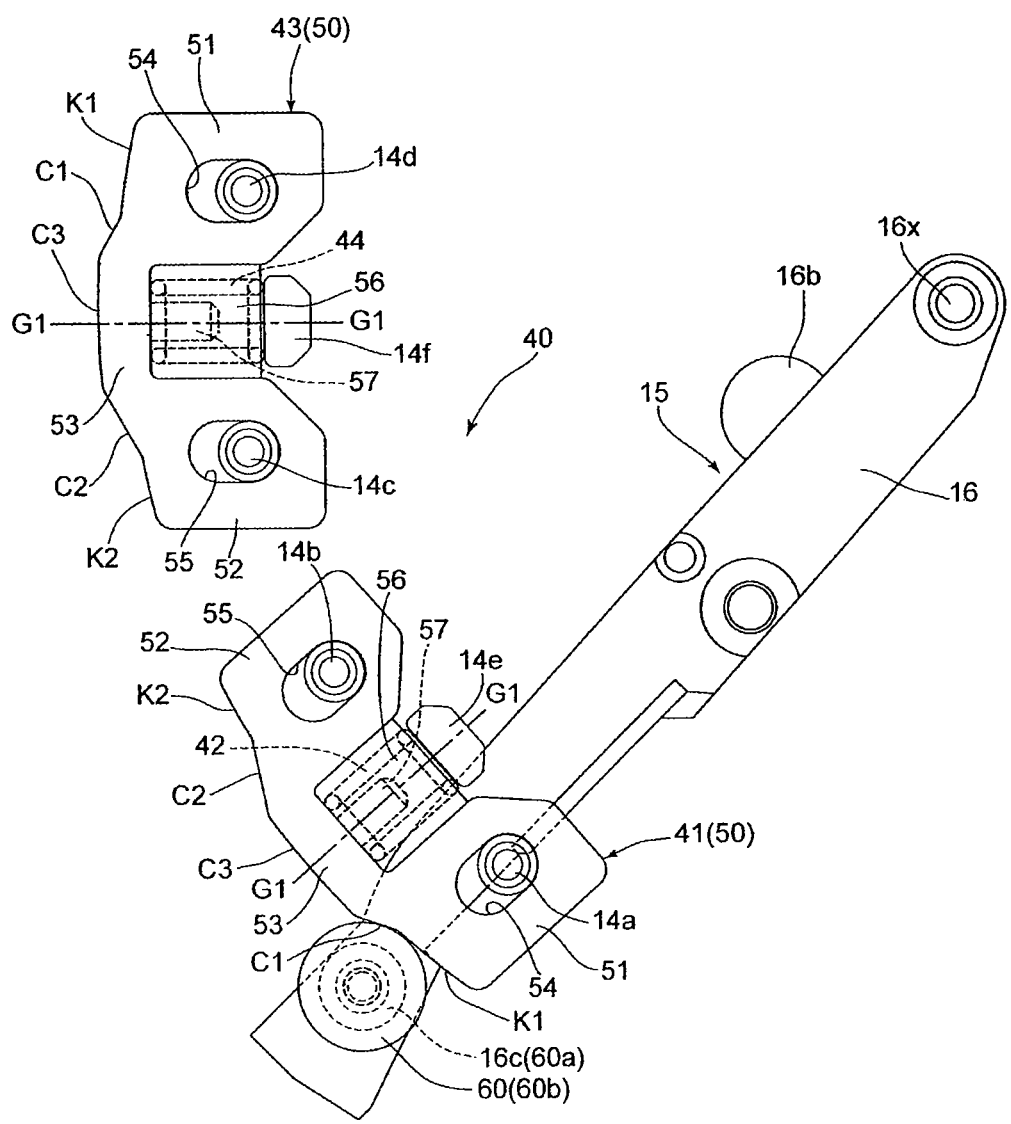
FIG. 10 is a side elevational view of the first embodiment of the mirror shock-absorbing mechanism in the mirror-down state.

Operations of the mirror shock-absorbing mechanism 40 will be discussed hereinafter. FIG. 10 shows a state where the movable mirror 15 is in the mirror-down position. In this state, the movable mirror 15 is held in the mirror-down position with the mirror seat boss 16*b* pressed downward by the mirror drive lever 34, which serves as a component of the mirror drive mechanism 30, to make the stopper 16*a* of the mirror seat 16 abut against the mirror-down position defining pin 20 (see FIG. 1). The mirror-down shock-absorbing member 41 is held at the shock-absorbing stand-by position thereof by the biasing force of the mirror-down shock-absorbing spring 42. The mirror-up shock-absorbing member 43 is held at the shock-absorbing stand-by position thereof by the biasing force of the mirror-up shock-absorbing spring 44. As can be seen from FIG. 16, the gently inclined surface k1 is positioned at a greater radial distance (from the axis of the pair of mirror seat hinges 16*x*) than that of the gently inclined surface K2, and the first cam surface C1 and the gently inclined surface k1 are in contact with the large-diameter portion 60*b* of the roller 60 that is provided on the mirror seat 16 when the movable mirror 15 is in the mirror-down position. The first cam surface C1 of the mirror-down shock-absorbing member 41 when the movable mirror 15 is in the mirror-down position that is shown in FIG. 10 is a surface inclined in a direction to exert resistance on rotation of the movable mirror 15 toward the mirror-up direction via the roller 60 and limits bouncing of the movable mirror 15 from the mirror-down position.

When the movable mirror 15 is rotated from the mirror-down position toward the mirror-up position by the mirror drive lever 34 of the mirror drive mechanism 30, at an initial stage of this rotation the large-diameter portion 60b of the roller 60 presses the mirror-down shock absorbing member 41 while rolling on the first cam surface C1 to thereby press and move the mirror-down shock-absorbing member 41 radially inwards (i.e., toward the axis of the pair of mirror seat hinges 16x) from the shock-absorbing stand-by position (shown in FIG. 10) against the biasing force of the mirror-down shock-absorbing spring 42. At this stage, the large-diameter portion 60b of the roller 60 rides over the first cam surface C1, which is formed as a gentle inclined surface, and accordingly, the movable mirror 15 can be rotated smoothly toward the mirror-up position from the mirror-down position by the mirror drive mechanism 30 with no occurrence of catching between the roller 60 and the mirror-down shock-absorbing member 41. After the large-diameter portion 60b of the roller 60 rides over the third cam surface C3 from the first cam surface C1 and passes over the second cam surface C2 and the gently inclined surface K2, following the rotation of the movable mirror 15 in the rotational direction toward the mirror-up position, the mirror-down shock-absorbing member 41 is released from being pressed by the roller 60, thus returning to the shock-absorbing stand-by position by the biasing force of the mirror-down shock-absorbing spring 42.

Figure 11:
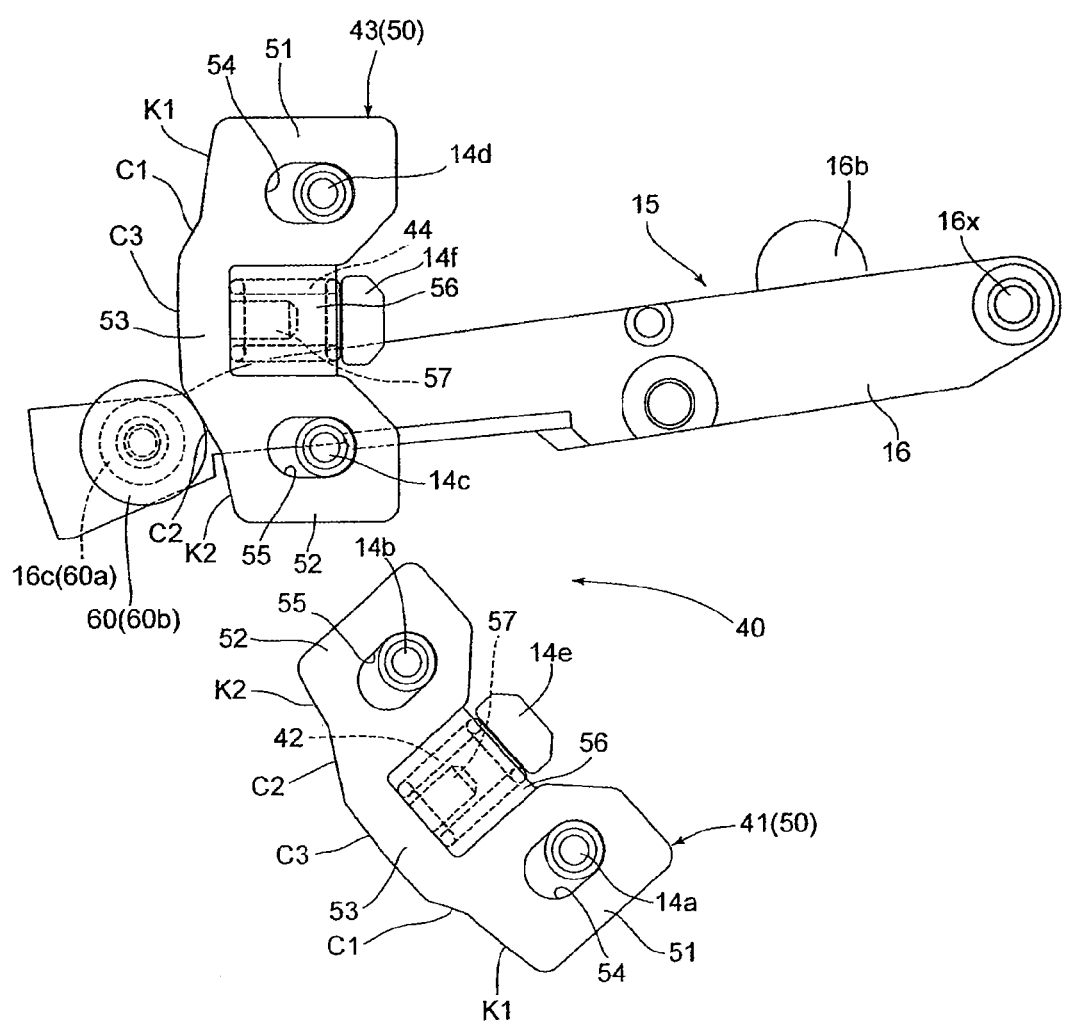
FIG. 11 is a side elevational view of the first embodiment of the mirror shock-absorbing mechanism in a state where the movable mirror is in the process of rotating to the mirror-up position from the mirror-down position.
Figure 12:
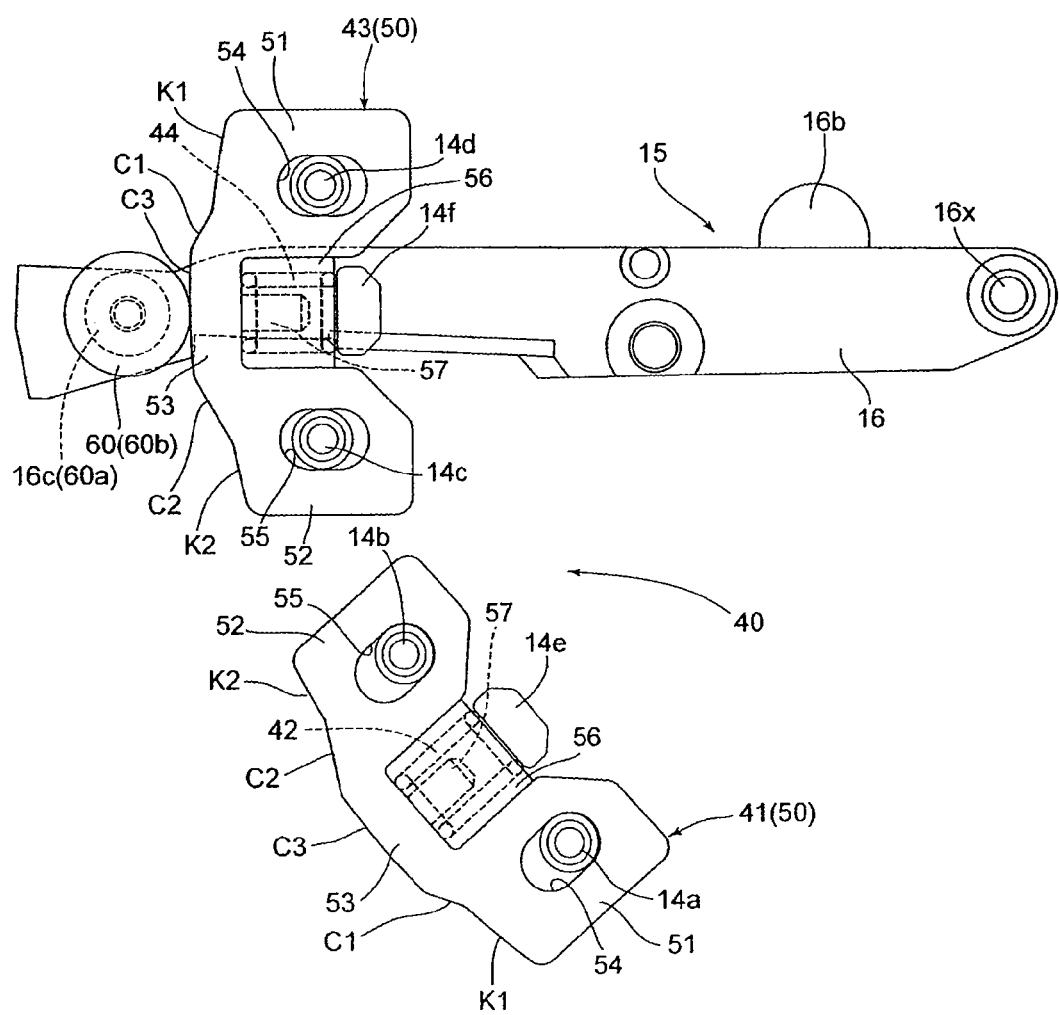
FIG. 12 is a side elevational view of the first embodiment of the mirror shock-absorbing mechanism in a state where the movable mirror is in the process of rotating to the mirror-up position from the mirror-down position.

When the movable mirror 15 approaches the mirror-up position, the large-diameter portion 60b of the roller 60 of the mirror seat 16 comes into contact with the second cam surface C2 of the mirror-up shock-absorbing member 43 as shown in FIG. 11. Since the gently inclined surface K2, which is positioned in front of the second cam surface C2 in the forward/rearward direction, is positioned at a shorter radial distance (from the axis of the pair of mirror seat hinges 16x) than that of the gently inclined surface k1 as illustrated above with reference to FIG. 16, the large-diameter portion 60b does not come into contact with an edge of the wing-shaped portion 52 of the mirror-up shock-absorbing member 43 before coming into contact with the second cam surface C2, thus not interfering with rotation of the movable mirror 15. At the instant shown in FIG. 11, the movable mirror 15 has not yet reached the mirror-up position, and a further rotation of the movable mirror 15 toward the mirror-up position causes the large-diameter portion 60b of the roller 60 to press and move the mirror-up shock-absorbing member 43 radially inwards (i.e., toward the axis of the pair of mirror seat hinges 16x; rightward with respect to FIG. 12) from the shock-absorbing stand-by position against the biasing force of the mirror-up shock-absorbing spring 44 while rolling from the second cam surface C2 to the third cam surface C3 thereon as shown in FIG. 12. During the time the mirror-up shock-absorbing member 43 is pressed by the roller 60 from the shock-absorbing stand-by position, the load of the mirror-up shock-absorbing spring 44 acts against the rotation of the movable mirror 15, while the movable mirror 15 rotates while being shock-absorbed by the mirror-up shock-absorbing member 43 and the mirror-up shock-absorbing spring 44. Since the third cam surface C3 of the mirror-up shock-absorbing member 43 has a shape such that the amount of projection thereof toward the radially outer side gradually increases in the moving direction of the roller 60 when the movable mirror 15 rotates toward the mirror-up position, the load on the movable mirror 15 gradually increases during the time the large-diameter portion 60b of the roller 60 rolls while pressing the third cam surface C3, and the load on the movable mirror 15 becomes maximum immediately before the large-diameter portion 60b of the roller 60 rides over the third cam surface C3 toward the first cam surface C1 side.

Figure 13:
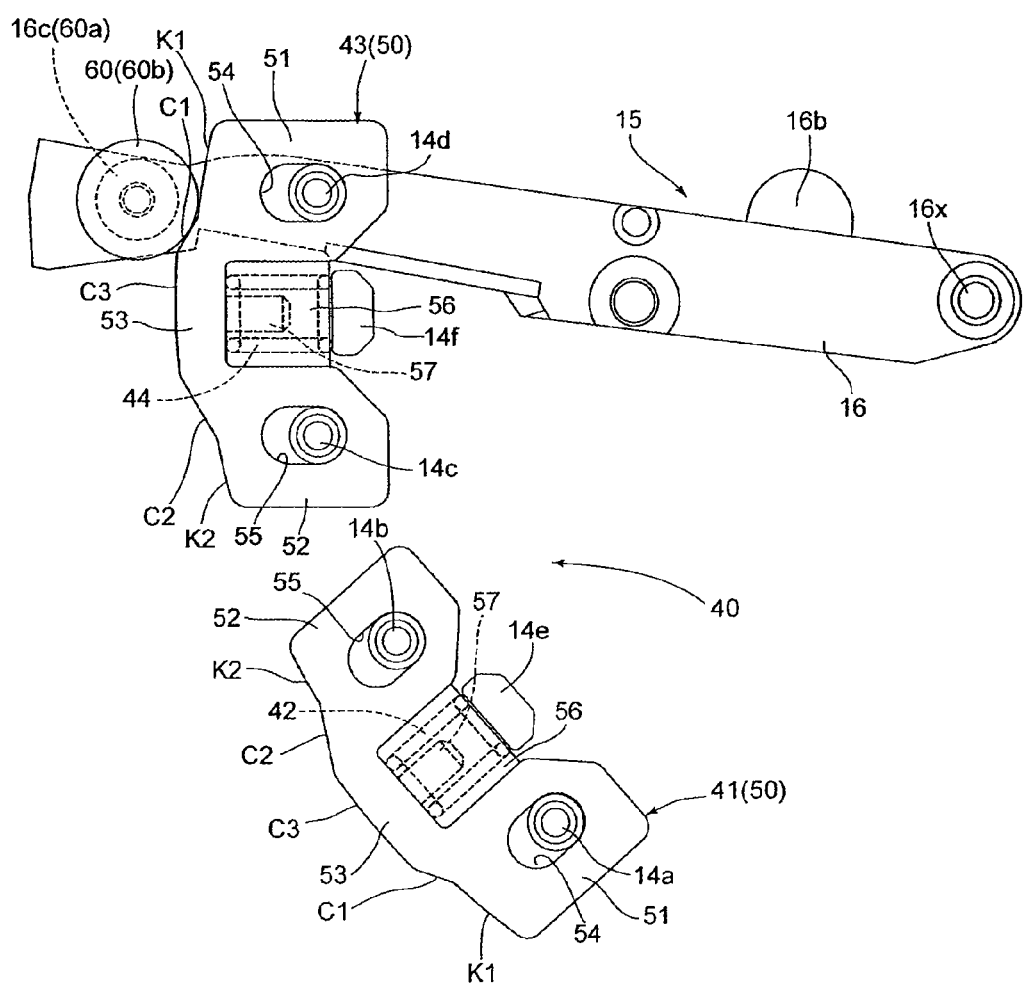
FIG. 13 is a side elevational view of the first embodiment of the mirror shock-absorbing mechanism in the mirror-up state.

When the movable mirror 15 is rotated to the mirror-up position that is shown in FIG. 13, an upper surface of the mirror seat 16 comes into contact with the upper stopper 21, so that the movable mirror 15 is prevented from further rotating upward (see FIG. 1). In this mirror-up state, the large-diameter portion 60b of the roller 60 has reached a position that opposes (or contacts) the first cam surface C1 and the gently inclined surface k1 after riding over the third cam surface C3 of the mirror-up shock-absorbing member 43, and the mirror-up shock-absorbing member 43 which has been released from being pressed by the roller 60 has returned to the shock-absorbing stand-by position by the biasing force of the mirror-up shock-absorbing spring 44. In this state, if a force to move the movable mirror 15 back toward the mirror-down position is acted upon the movable mirror 15 which has reached the mirror-up position, resistance is exerted on this reverse rotation of the movable mirror 15 by engagement between the first cam surface C1 of the mirror-up shock-absorbing member 43 (which has returned to the shock-absorbing stand-by position) and the large-diameter portion 60b of the roller 60. In order for the movable mirror 15 to further rotate toward the mirror-down position, it is required to press and move the mirror-up shock-absorbing member 43 against the biasing force of the mirror-up shock-absorbing spring 44; however, unlike the movement of the movable mirror 15 caused by the driving force of the mirror drive mechanism 30, the reaction of the movable mirror 15 caused upon the movable mirror 15 reaching the mirror-up position cannot exert a force on the mirror-up shock-absorbing member 43 which is strong enough to move the mirror-up shock-absorbing member 43 that is biased by the mirror-up shock-absorbing spring 44, so that the mirror-up shock-absorbing member 43 in effect serves as a stopper for preventing the movable mirror 15 from bouncing.

As described above, when the movable mirror 15 rotates to the mirror-up position from the mirror-down position, the load of the mirror-up shock-absorbing spring 44 acts on the movable mirror 15 to absorb shock of the movable mirror 15 while the mirror-up shock-absorbing member 43 is pressed and moved from the shock-absorbing stand-by position by the roller 60. Rotational rebounding (bouncing) of the movable mirror 15 toward the mirror-down position upon the movable mirror 15 reaching the mirror-up position is limited (restricted) by the mirror-up shock-absorbing member 43 which has returned to the shock-absorbing stand-by position. Accordingly, the movable mirror 15 can be held in the mirror-up position while the bounce of the movable mirror 15 which occurs upon the movable mirror 15 reaching the mirror-up position is reliably suppressed by the mirror-up shock-absorbing member 43.

Conversely to the above described operations to move the movable mirror 15 to the mirror-up position, when the movable mirror 15 is rotated toward the mirror-down position from the mirror-up position that is shown in FIG. 13 by the mirror drive lever 34 of the mirror drive mechanism 30, at an initial stage of this rotation of the movable mirror 15, the large-diameter portion 60b of the roller 60 presses the mirror-up shock absorbing member 43 while rolling on the first cam surface C1. Similar to the mirror-down shock-absorbing member 41 at an initial stage of the above described operations to move the movable mirror 15 to the mirror-up position, the mirror-up shock absorbing member 43, the first cam surface C1 of which is pressed by the large-diameter portion 60b of the roller 60, is moved radially inwards (i.e., toward the axis of the pair of mirror seat hinges 16x) from the shock-absorbing stand-by position against the biasing force of the mirror-up shock-absorbing spring 44. Subsequently, the movable mirror 15 continues to rotate toward the mirror-down position without being stopped by a load caused by pressing and moving the mirror-up shock absorbing member 43 because the mirror drive mechanism 30 exerts a driving force in the direction toward the mirror-down direction on the movable mirror 15, unlike the above described case at the occurrence of bounce of the movable mirror 15 after the movable mirror 15 reaches the mirror-up position.

Figure 14:
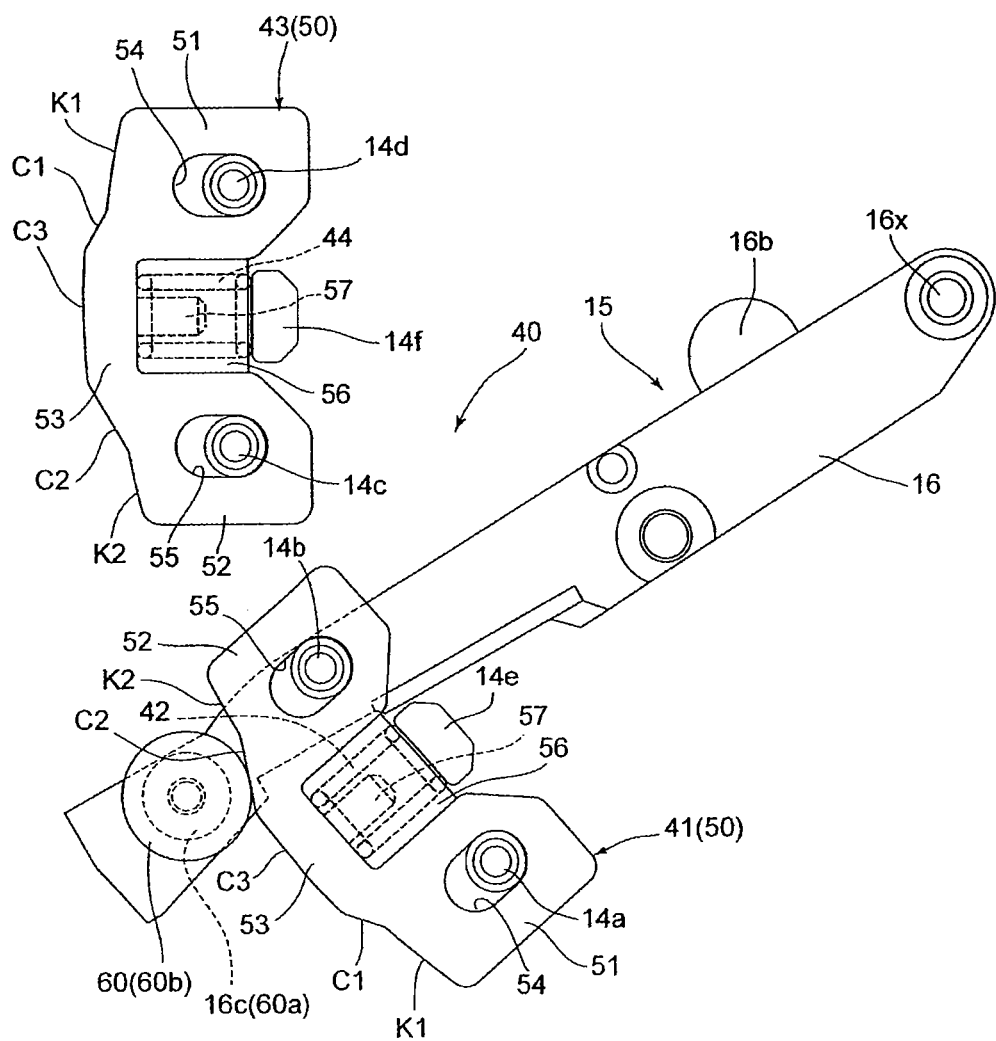
FIG. 14 is a side elevational view of the first embodiment of the mirror shock-absorbing mechanism in a state where the movable mirror is in the process of rotating to the mirror-down position from the mirror-up position.
Figure 15:
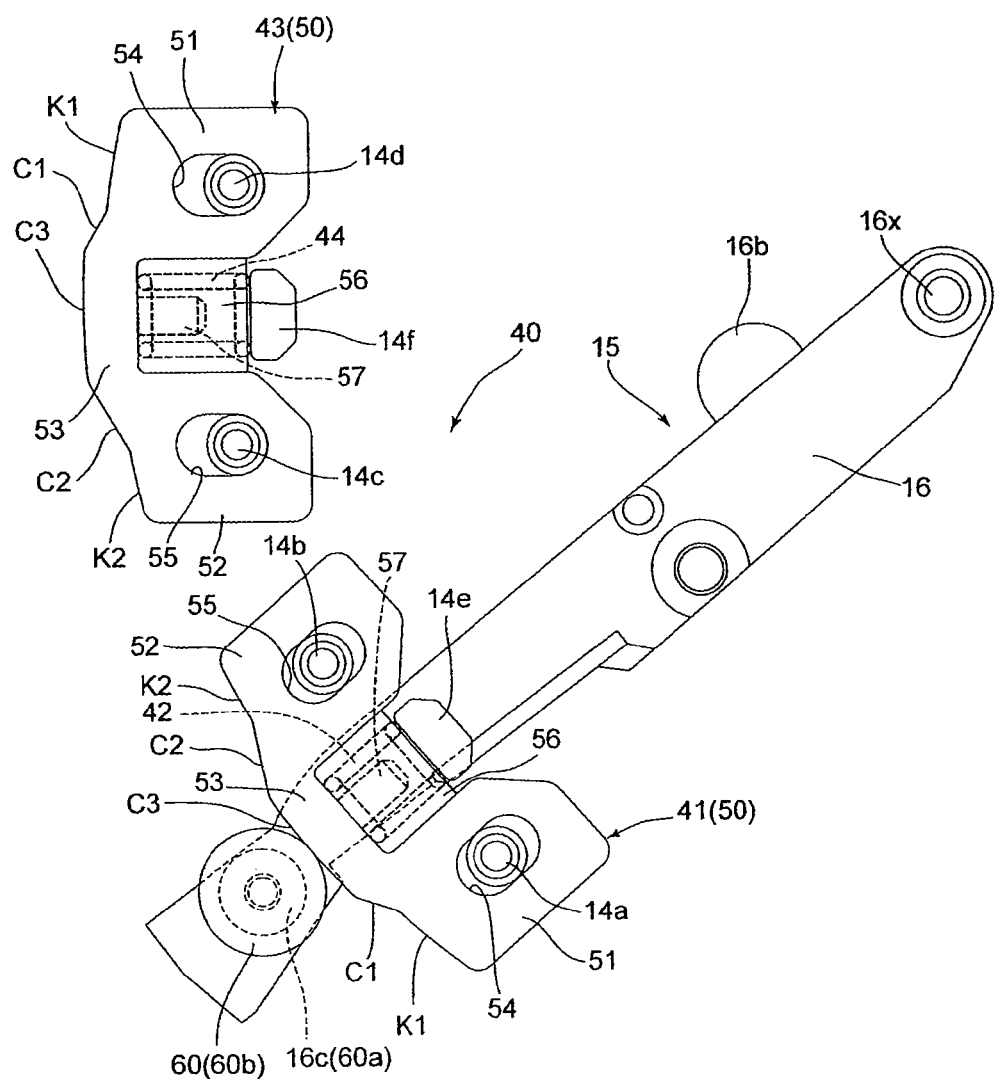
FIG. 15 is a side elevational view of the first embodiment of the mirror shock-absorbing mechanism in a state where the movable mirror is in the process of rotating to the mirror-down position from the mirror-up position.

When the movable mirror 15 approaches the mirror-down position, the large-diameter portion 60b of the roller 60 of the mirror seat 16 comes into contact with the second cam surface C2 of the mirror-down shock-absorbing member 41 as shown in FIG. 14. Since the gently inclined surface K2, which is positioned in front of the second cam surface C2 in the forward/rearward direction, is closer to the radially inner side than the gently inclined surface k1 as illustrated above with reference to FIG. 16, the large diameter portion 60b does not come into contact with an edge of the wing-shaped portion 52 of the mirror-down shock-absorbing member 41 before coming into contact with the second cam surface C2, thus not interfering with rotation of the movable mirror 15. At the instant shown in FIG. 14, the movable mirror 15 has not yet reached the mirror-down position, and a further rotation of the movable mirror 15 toward the mirror-down position causes the large-diameter portion 60b of the roller 60 to press and move the mirror-down shock-absorbing member 41 radially inwards (i.e., toward the axis of the pair of mirror seat hinges 16x) from the shock-absorbing stand-by position against the biasing force of the mirror-down shock-absorbing spring 42 while rolling from the second cam surface C2 to the third cam surface C3 thereon as shown in FIG. 15. During the time the mirror-down shock-absorbing member 41 is pressed by the roller 60 from the shock-absorbing stand-by position, the load of the mirror-down shock-absorbing spring 42 acts on rotation of the movable mirror 15, while the movable mirror 15 rotates while being shock-absorbed by the mirror-down shock-absorbing member 41 and the mirror-down shock-absorbing spring 42. Since the third cam surface C3 of the mirror-down shock-absorbing member 41 has a shape such that the amount of projection thereof toward the radially outer side gradually increases in the moving direction of the roller 60 when the movable mirror 15 rotates toward the mirror-down position, the load on the movable mirror 15 gradually increases during the time the large-diameter portion 60b of the roller 60 rolls while pressing the third cam surface C3, and the load on the movable mirror 15 becomes maximum immediately before the large-diameter portion 60b of the roller 60 rides over the third cam surface C3 toward the first cam surface C1 side.

When the movable mirror 15 is rotated to the mirror-down position shown in FIG. 10, the stopper 16a of the mirror seat 16 comes into contact with the mirror-down position defining pin 20, so that the movable mirror 15 is prevented from further rotating downward (see FIG. 1). In this mirror-down state, the large-diameter portion 60b of the roller 60 has reached a position that opposes the first cam surface C1 and the gently inclined surface k1 after riding over the third cam surface C3 of the mirror-down shock-absorbing member 41, and the mirror-down shock-absorbing member 41 which has been released from being pressed by the roller 60 has returned to the shock-absorbing stand-by position by the biasing force of the mirror-down shock-absorbing spring 42. In this state, if a force to move the movable mirror 15 back toward the mirror-up position is acted upon the movable mirror 15 which has reached the mirror-down position, resistance is exerted on this reverse rotation of the movable mirror 15 by engagement between the first cam surface C1 of the mirror-down shock-absorbing member 41 (which has returned to the shock-absorbing stand-by position) and the large-diameter portion 60b of the roller 60. In order for the movable mirror 15 to further rotate toward the mirror-up position, it is required to press and move the mirror-down shock-absorbing member 41 against the biasing force of the mirror-down shock-absorbing spring 42; however, unlike the movement of the movable mirror 15 caused by the driving force of the mirror drive mechanism 30, the reaction of the movable mirror 15 caused upon the movable mirror 15 reaching the mirror-down position cannot exert a force on the mirror-down shock-absorbing member 41 which is strong enough to move the mirror-down shock-absorbing member 41 that is biased by the mirror-down shock-absorbing spring 42, so that the mirror-down shock-absorbing member 41 in effect serves as a stopper for preventing the movable mirror 15 from bouncing.

As described above, when the movable mirror 15 rotates to the mirror-down position from the mirror-up position, the load of the mirror-down shock-absorbing spring 42 acts on the movable mirror 15 to absorb shock of the movable mirror 15 while the mirror-down shock-absorbing member 41 is pressed and moved radially inwards (i.e., toward the axis of the pair of mirror seat hinges 16x) from the shock-absorbing stand-by position by the roller 60. Rotational rebounding (bouncing) of the movable mirror 15 toward the mirror-up position upon the movable mirror 15 reaching the mirror-down position is limited by the mirror-down shock-absorbing member 41 which has returned to the shock-absorbing stand-by position. Accordingly, the movable mirror 15 can be held in the mirror-down position while the bounce of the movable mirror 15 which occurs upon the movable mirror 15 reaching the mirror-down position is reliably suppressed by the mirror-down shock-absorbing member 41.

As described above, in the first embodiment of the mirror shock-absorbing mechanism 40 of the camera 10, the mirror-down shock-absorbing member 41 which suppresses bounce of the movable mirror 15 upon the movable mirror 15 reaching the mirror-down position, and the mirror-up shock-absorbing member 43 which suppresses bounce of the movable mirror 15 upon the movable mirror 15 reaching the mirror-up position, are configured of two slide members 50, respectively, which have the same specifications. In addition, the mirror-down shock-absorbing spring 42 and the mirror-up shock-absorbing spring 44, which bias the mirror-down shock-absorbing member 41 and the mirror-up shock-absorbing member 43, are configured of two compression springs, respectively, which have the same specifications. Therefore, bounce of the movable mirror 15 is reliably suppressed at each of the mirror-down position and the mirror-up position of the movable mirror 15, which makes it possible to achieve an improvement in continuous photographing capability, while a reduction in production cost via component commonality (common application of necessary components) can also be achieved.

Each slide member 50 is formed such that a surface thereof (which includes the cam surfaces C1, C2 and C3 and the gentle inclined surfaces k1 and K2) on the movable mirror 15 side which is pressed by the large-diameter portion 60b of the roller 60 has an asymmetrical shape with respect to the imaginary center line G1 that passes through the lateral center of the slide member 50, and the two slide members 50 respectively used as the mirror-down shock-absorbing member 41 and the mirror-up shock-absorbing member 43 are installed to the mirror box 14 with the front (or back) of one of the two slide members 50 and the front (or back) of the other slide member 50 facing toward opposite directions. This configuration makes it possible to use two slide members 50, having the same specifications, for the mirror-down shock-absorbing member 41 and the mirror-up shock-absorbing member 43, respectively, while optimizing the load characteristics of the two slide members 50 (the mirror-down shock-absorbing member 41 and the mirror-up shock-absorbing member 43) at each of the following three times: when the large-diameter portion 60b of the roller 60 comes into contact with the mirror-down shock-absorbing member 41 or the mirror-up shock-absorbing member 43 during rotation of the movable mirror 15, when the mirror-down shock-absorbing member 41 or the mirror-up shock-absorbing member 43 is pressed and moved radially inwards by the large-diameter portion 60b of the roller 60, and when the mirror-down shock-absorbing member 41 or the mirror-up shock-absorbing member 43 holds the large-diameter portion 60b of the roller 60 upon the movable mirror 15 arriving at the mirror-down position (one of the two rotational limits of the movable mirror 15) or the mirror-up position (the other rotational limit of the movable mirror 15).

In addition, a smooth operation of the mirror shock-absorbing mechanism is achieved by the above described structure in which part of the movable mirror 15 which comes into contact with the mirror-down shock-absorbing member 41 and the mirror-up shock-absorbing member 43 is provided as the roller 60.

A second embodiment of the mirror shock-absorbing mechanism that is designated by the reference numeral 140 will be hereinafter discussed with reference to FIGS. 1, and 16 through 31. In the mirror shock-absorbing mechanism 140, elements thereof which are common to those of the first embodiment of the mirror shock-absorbing mechanism 40 are designated by the same reference numerals, and the descriptions of these elements are omitted in the following description.

The mirror shock-absorbing mechanism 140 is provided with a mirror-down shock-absorbing member (shock-absorbing member/first shock-absorbing member) 141, a mirror-down shock-absorbing spring (biaser) 142, a mirror-up shock-absorbing member (shock-absorbing member/second shock-absorbing member) 143, a mirror-up shock-absorbing spring (biaser) 144 and a mirror follower 61.

The mirror-down shock-absorbing member 141 absorbs shock of the movable mirror 15 and suppresses bounce of the movable mirror 15 when the movable mirror 15 rotates to the mirror-down position, and the mirror-up shock-absorbing member 143 absorbs shock of the movable mirror 15 and suppresses bounce of the movable mirror 15 when the movable mirror 15 rotates to the mirror-up position. Similar to the first embodiment of the mirror-shock absorbing mechanism 40, two slide members 50 having the same specifications are provided as the mirror-down shock-absorbing member 141 and the mirror-up shock-absorbing member 143, respectively; namely, the mirror-down shock-absorbing member 141 and the mirror-up shock-absorbing member 143 are mutually identical in specifications. The two slide members 50 are properly used as the mirror-down shock-absorbing member 141 and the mirror-up shock-absorbing member 143, respectively, by being installed onto the mirror box 14 with the front (or back) of one of the two slide members 50 and the front (or back) of the other slide member 50 facing mutually opposite directions. Each slide member 50 in the second embodiment of the mirror-shock absorbing mechanism is identical in structure to that in the second embodiment of the mirror-shock absorbing mechanism (see FIG. 16). Therefore, a detailed description of each slide member 50 will be omitted from the following description. In addition, the mirror-down shock-absorbing spring 142 and the mirror-up shock-absorbing spring 144 are mutually identical in specifications.

The mirror box 14 is provided on one side thereof with four guide pins, specifically, two pairs of guide pins 114a and 114b, and 114c and 114d, that are arranged at predetermined intervals along the rotational direction of the movable mirror 15. The mirror-down shock-absorbing member 141 is supported by engagement of the pair of guide pins 114a and 114b with the pair of guide holes 54 and 55, with the pair of guide holes 54 and 55 guided by the pair of guide pins 114a and 114b to be movable linearly in a radial direction of the movable mirror with respect to the axis of the pair of mirror seat hinges 16x in a plane orthogonal to this axis. The mirror-down shock-absorbing member 141 is biased in a direction away from the axis of the pair of mirror seat hinges 16x by the mirror-down shock-absorbing spring 142 that is supported by a spring support projection 114e. The mirror-down shock-absorbing member 141 is prevented from moving in the biasing direction of the mirror-down shock-absorbing spring 142 by engagement of one end of the pair of guide holes 54 and 55 with the pair of guide pins 114a and 114b, respectively. The limit of movement of the mirror-down shock-absorbing member 141 in this biasing direction corresponds to a shock-absorbing stand-by position of the mirror-down shock-absorbing member 141. Similar to the moving direction of the mirror-down shock-absorbing member 41 in the first embodiment of the mirror shock-absorbing mechanism, the moving direction of the mirror-down shock-absorbing member 141 is set obliquely downward/upward with respect to the horizontal direction in a state where the camera 10 is held horizontally; however, the angle of the moving direction of the mirror-down shock-absorbing member 141 is closer to the vertical direction than that of the mirror-down shock-absorbing member 41 due to the position settings of the pair of guide pins 114a and 114b and the spring support projection 114e. In other words, the moving direction of the mirror-down shock-absorbing member 141 intersects the rotational path of the movable mirror 15 at an orthogonal direction thereto.

Similar to the mirror-down shock-absorbing member 141, the mirror-up shock-absorbing member 143 is supported by engagement of the pair of guide pins 114d and 114c with the pair of guide holes 54 and 55, with the pair of guide holes 54 and 55 guided by the pair of guide pins 114d and 114c to be movable linearly in a radial direction of the movable mirror with respect to (toward/away from) the axis of the pair of mirror seat hinges 16x in a plane orthogonal to this axis. The mirror-up shock-absorbing member 143 is biased in a direction away from the axis of the pair of mirror seat hinges 16x by the mirror-up shock-absorbing spring 144 that is supported by a spring support projection 114f. The mirror-up shock-absorbing member 144 is prevented from moving in the biasing direction of the mirror-up shock-absorbing spring 144 by engagement of one end of the pair of guide holes 54 and 55 with the pair of guide pins 114d and 114c, respectively. The limit of movement of the mirror-up shock-absorbing member 143 in this biasing direction corresponds to a shock-absorbing stand-by position of the mirror-up shock-absorbing member 143. Although the moving direction of the mirror-up shock-absorbing member 43 in the first embodiment of the mirror shock-absorbing mechanism is substantially horizontal in a state where the camera 10 is held horizontally, the moving direction of the mirror-up shock-absorbing member 143 is set slightly oblique in the upward/downward direction due to the position settings of the pair of guide pins 114d and 114e and the spring support projection 114f. In other words, the moving direction of the mirror-up shock-absorbing member 143 intersects the rotational path of the movable mirror 15 at an orthogonal direction thereto.

Figure 22:
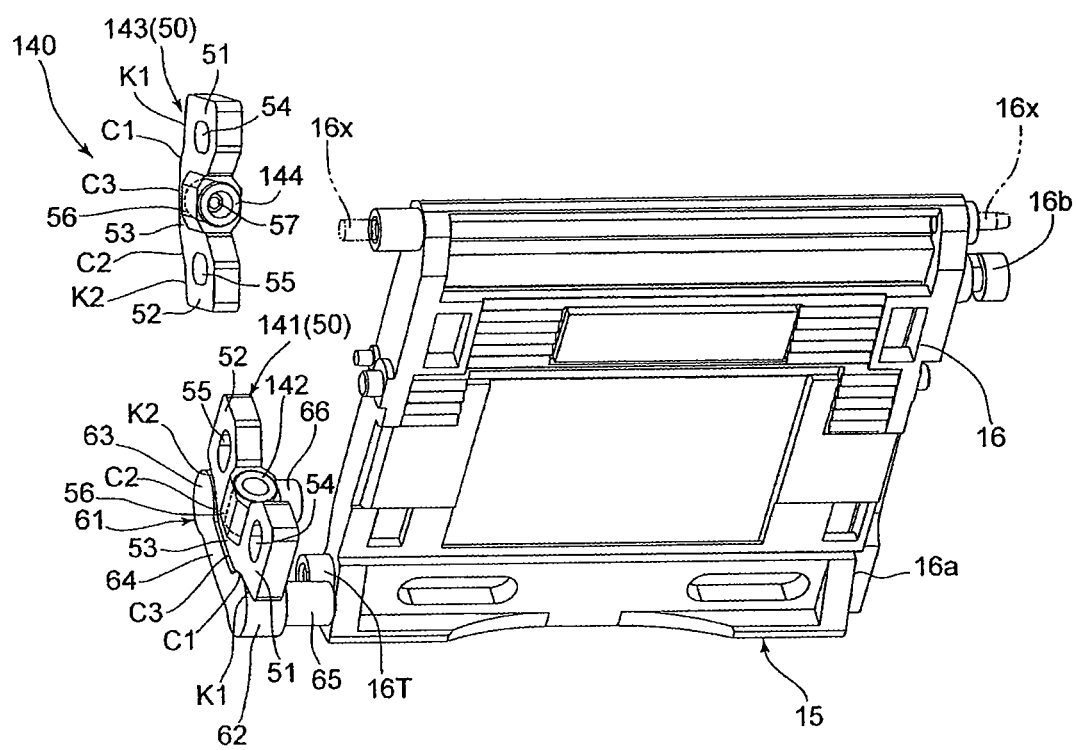
FIG. 22 is a rear perspective view of the second embodiment of the mirror shock-absorbing mechanism in the mirror-down state.
Figure 23:
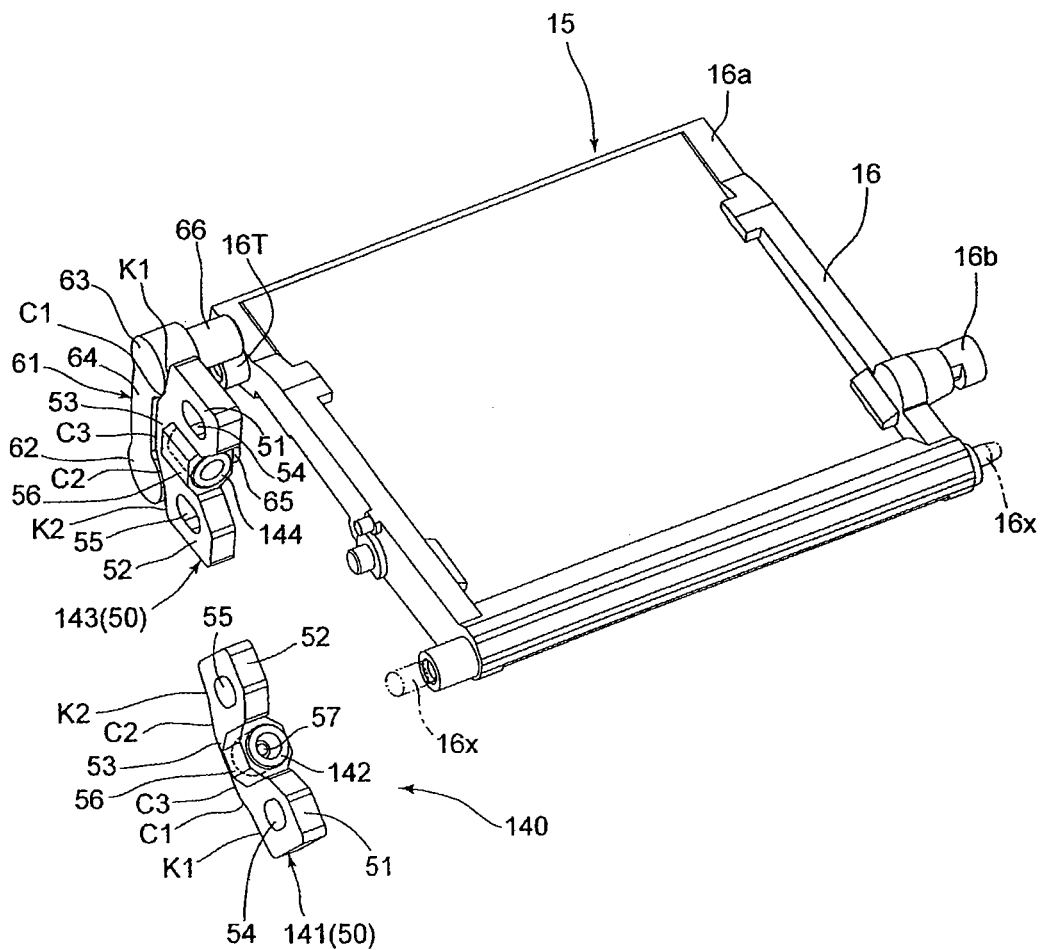
FIG. 23 is a rear perspective view of the mirror shock-absorbing mechanism according to the second embodiment, in the mirror-up state.
Figure 24:
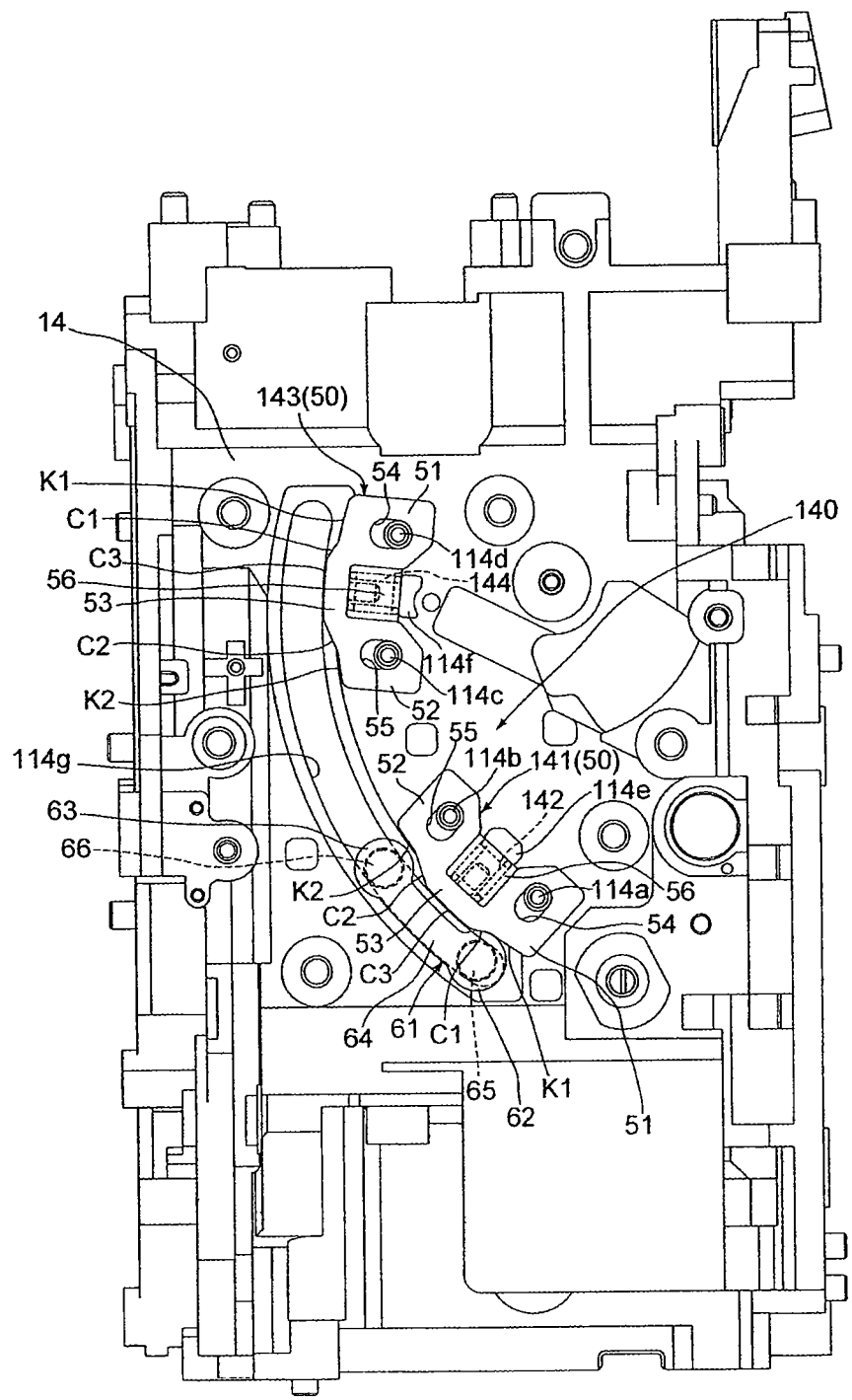
FIG. 24 is a left side elevational view of the mirror box unit, according to the second embodiment, with the retaining plate removed to expose the mirror shock-absorbing mechanism.

As shown in FIGS. 22 and 23, the mirror seat 16 is provided, on a side thereof in the vicinity of the free end of the mirror seat 16, with a pressing projection 16T. The mirror box 14 is provided with a guide through-hole 114g in the shape of a circular arc. The guide through-hole 114g extends along a path of the pressing projection 16T when the movable mirror 15 rotates between the mirror-up position and the mirror-down position. As shown in FIGS. 24 through 30, when the mirror-down shock-absorbing member 141 and the mirror-up shock-absorbing member 143 are held at the respective shock-absorbing stand-by positions thereof, respectively, the third cam surface C3 of the mirror-down shock-absorbing member 141 and the third cam surface C3 of the mirror-up shock-absorbing member 143 substantially coincide with the radially inner surface of the guide through-hole 114g as viewed from either the left or right side of the mirror box 19.

Figure 17:
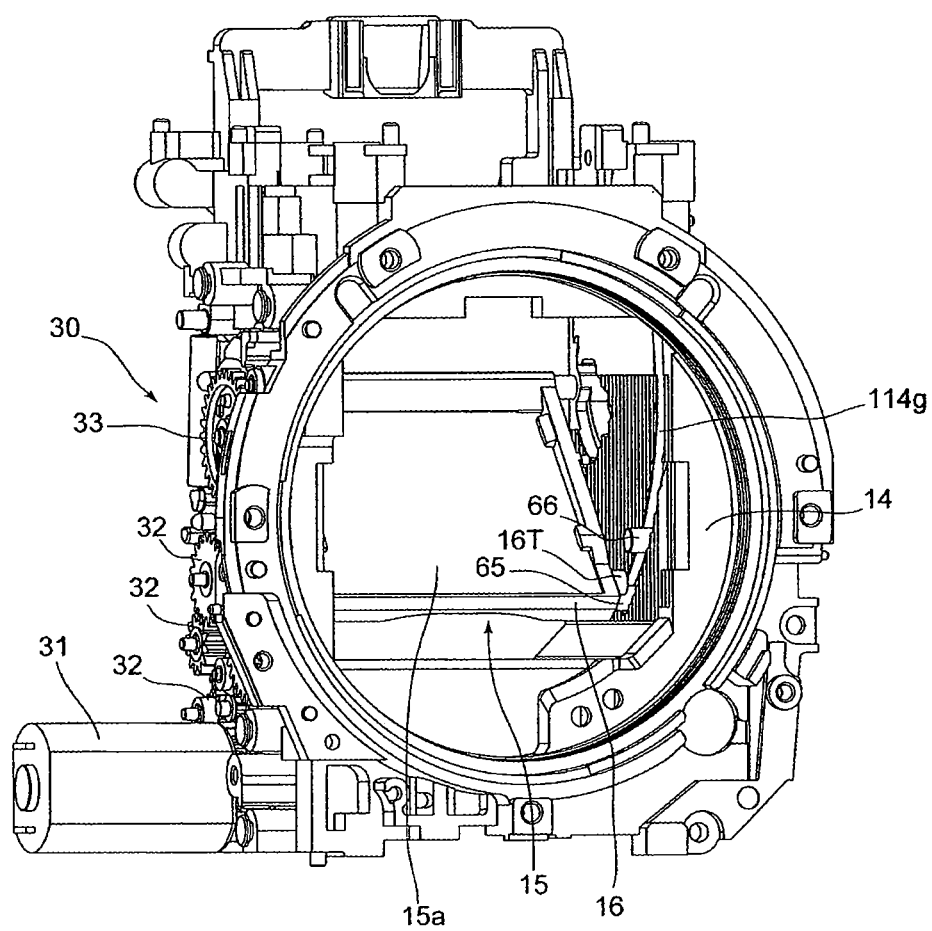
FIG. 17 is a front perspective view of the mirror box unit of the camera which is equipped with a mirror shock-absorbing mechanism according to a second embodiment, showing the mirror box unit in the mirror-down state.
Figure 18:
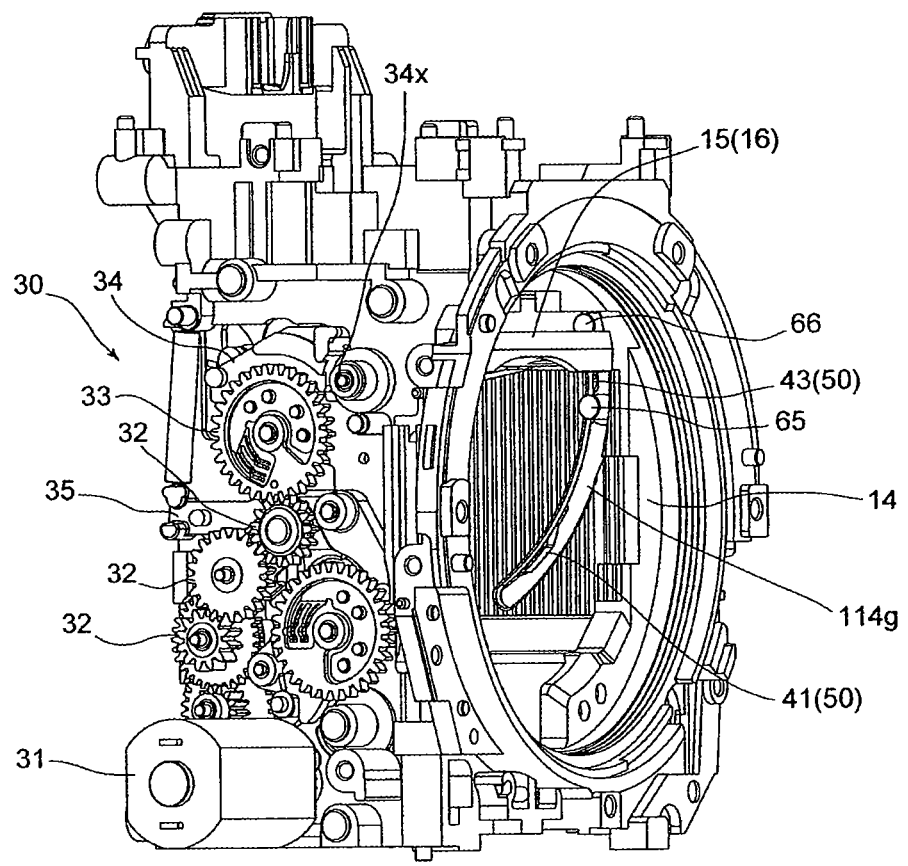
FIG. 18 is a front perspective view of the mirror box unit of the camera that is equipped with the mirror shock-absorbing mechanism according to the second embodiment, showing the mirror box unit in the mirror-up state.
Figure 19:
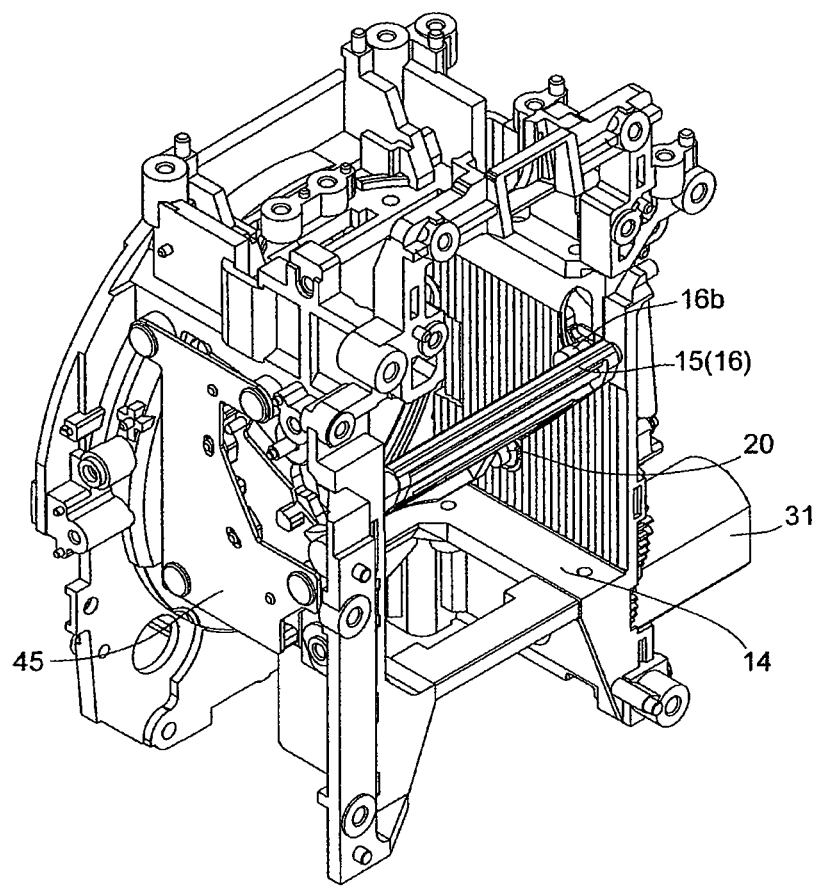
FIG. 19 is a rear perspective view of the mirror box unit of the camera that is equipped with the mirror shock-absorbing mechanism according to the second embodiment, showing the mirror box unit in the mirror-down state.
Figure 20:
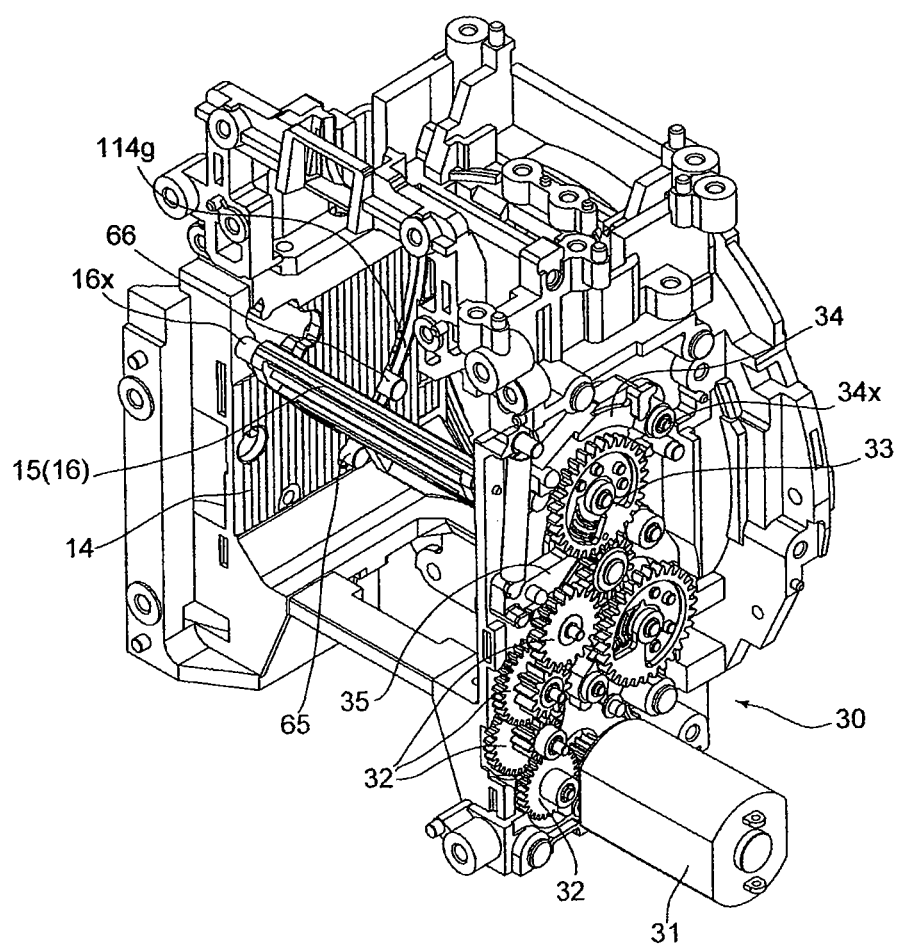
FIG. 20 is a rear perspective view of the mirror box unit of the camera that is equipped with the mirror shock-absorbing mechanism according to the second embodiment, showing the mirror box unit in the mirror-down state.
Figure 21:
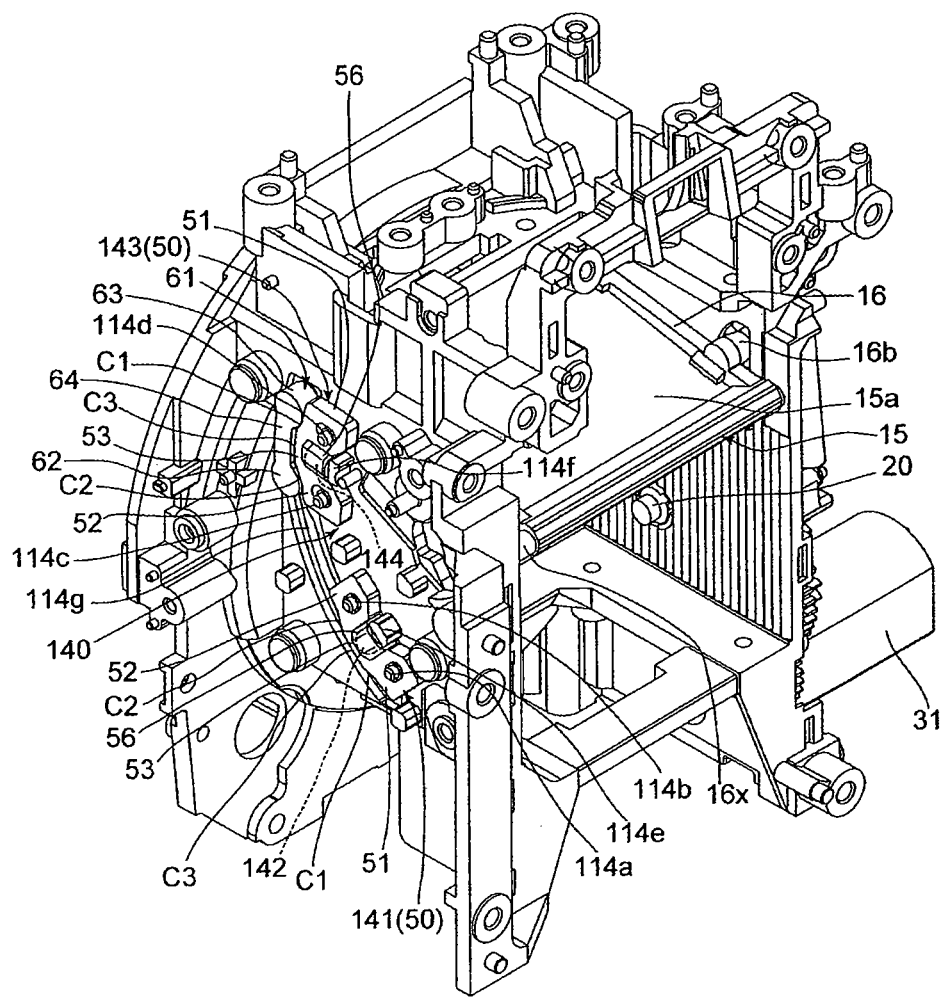
FIG. 21 is a rear perspective view of the mirror box unit of the camera that is equipped with the mirror shock-absorbing mechanism according to the second embodiment, showing the mirror box unit in the mirror-up state.
Figure 31:
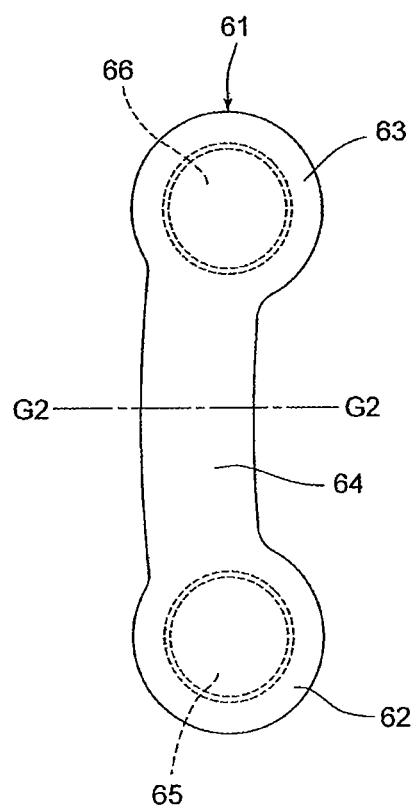
FIG. 31 is a plan view of a mirror follower which serves as an element of the second embodiment of the mirror shock-absorbing mechanism, showing the shape of the mirror follower itself.

As shown in FIG. 31, the mirror follower 61 is provided with a cylindrical (columnar) contact portion (first contact portion) 62, a cylindrical (columnar) contact portion (second contact portion) 63 and a connecting portion 64 in the shape of a slightly-curved circular arc via which the contact portions 62 and 63 are connected. The mirror follower 61 has a substantially symmetrical shape with respect to an imaginary center line G2 which passes through the center (midway between the contact portions 62 and 63) of the connecting portion 64 with respect to the lengthwise direction thereof. The two contact portions 62 and 63 have a cylindrical outer peripheral shape, and the width of the connecting portion 64 is smaller than the diameter of each contact portion 62 and 63. The length of the connecting portion 64 corresponds to the width of the middle bridge portion 53 of each slide member 50. The two contact portions 62 and 63 are provided with a press-receiving projection (first press-receiving portion) 65 and a press-receiving projection (second press-receiving portion) 66, respectively, which project laterally to be engaged in the guide through-hole 114g. The press-receiving projection 65 and the press-receiving projection 66 are cylindrical (columnar) in shape and mutually identical in diameter. As shown in FIGS. 17, 18 and 20, the press-receiving projection 65 and the press-receiving projection 66 project into the inside of the mirror box 14 through the guide through-hole 114g and are spaced from each other in a direction along the guide through-hole 114g. The press-receiving projection 65 and the press-receiving projection 66 are inserted into the guide through-hole 114g with substantially no play between the radially opposed sides (the radially outer side and the radially inner side) of the guide through-hole 114g, and the mirror follower 61 is movable along the guide through-hole 119g with the press-receiving projection 65 and the press-receiving projection 66 guided by the radially opposed sides of the guide through-hole 119g. Accordingly, the mirror follower 61 is supported by the mirror box 14 to be movable along a path of the pressing projection 16T when the movable mirror 15 rotates. The pressing projection 16T is positioned between the press-receiving projection 65 and the press-receiving projection 66, and comes into contact with the press-receiving projection 65 and the press-receiving projection 66 to transfer power in counterclockwise and clockwise directions (with respect to FIG. 29) to the mirror follower 61 when the movable mirror 15 is rotated toward the mirror-down position and the mirror-up position, respectively. The distance between the press-receiving projection 65 and the press-receiving projection 66 is predetermined so that the pressing projection 16T comes into contact with one of the press-receiving projection 65 and the press-receiving projection 66 after the movable mirror 15 rotates (idles with respect to the mirror follower 61) a predetermined amount of rotation in a state where the pressing projection 16T is in contact with the other of the press-receiving projection 65 and the press-receiving projection 66. In other words, a space allowing for idle rotation of the movable mirror 15 which allows the pressing projection 16T to rotate (move in the guide through-hole 114g) without contacting either the press-receiving projection 65 or the press-receiving projection 66 is provided between the press-receiving projection 65 and the press-receiving projection 66.

Figure 25:
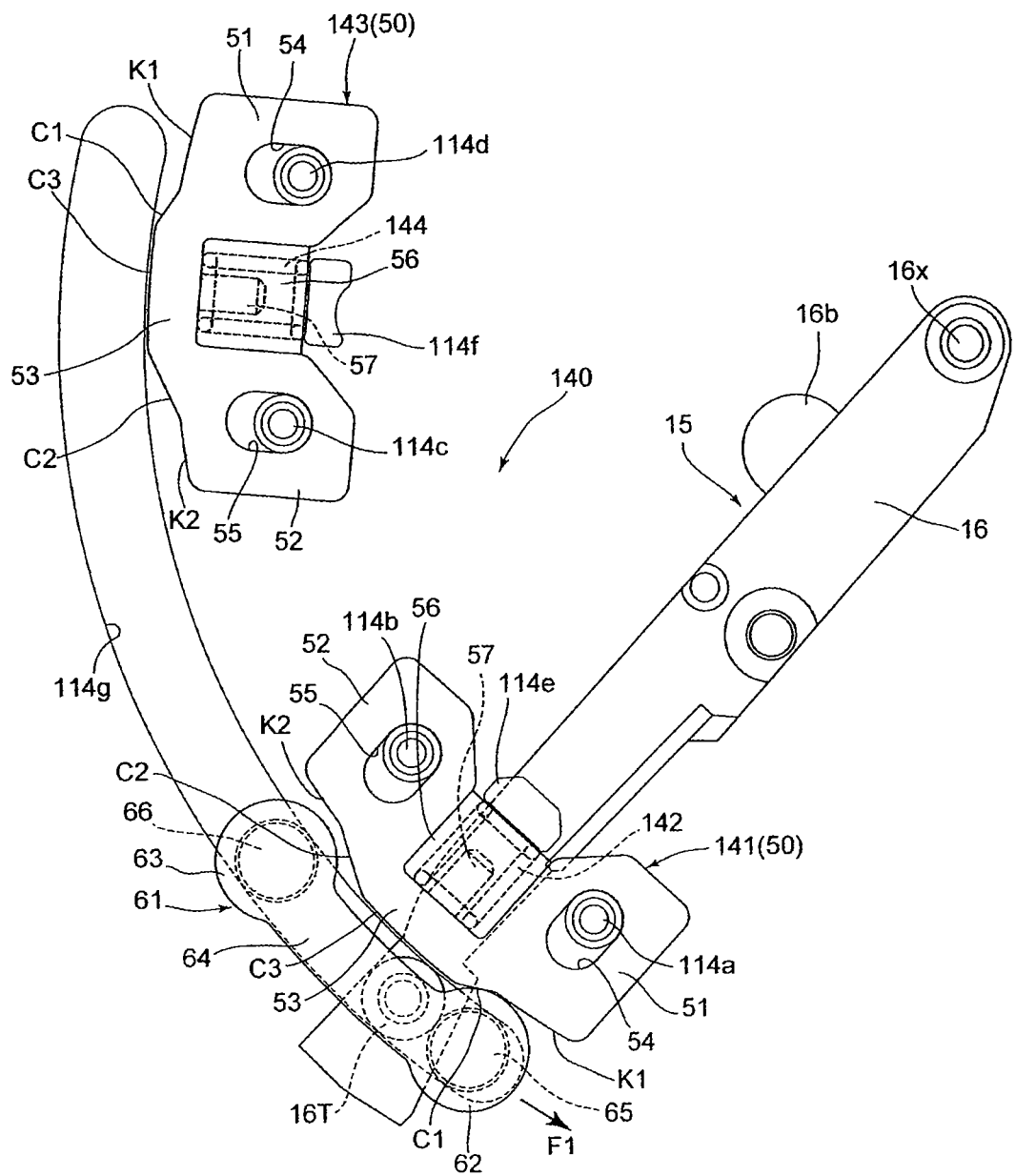
FIG. 25 is a side elevational view of the mirror shock-absorbing mechanism, according to the second embodiment, in the mirror-down state.
Figure 26:
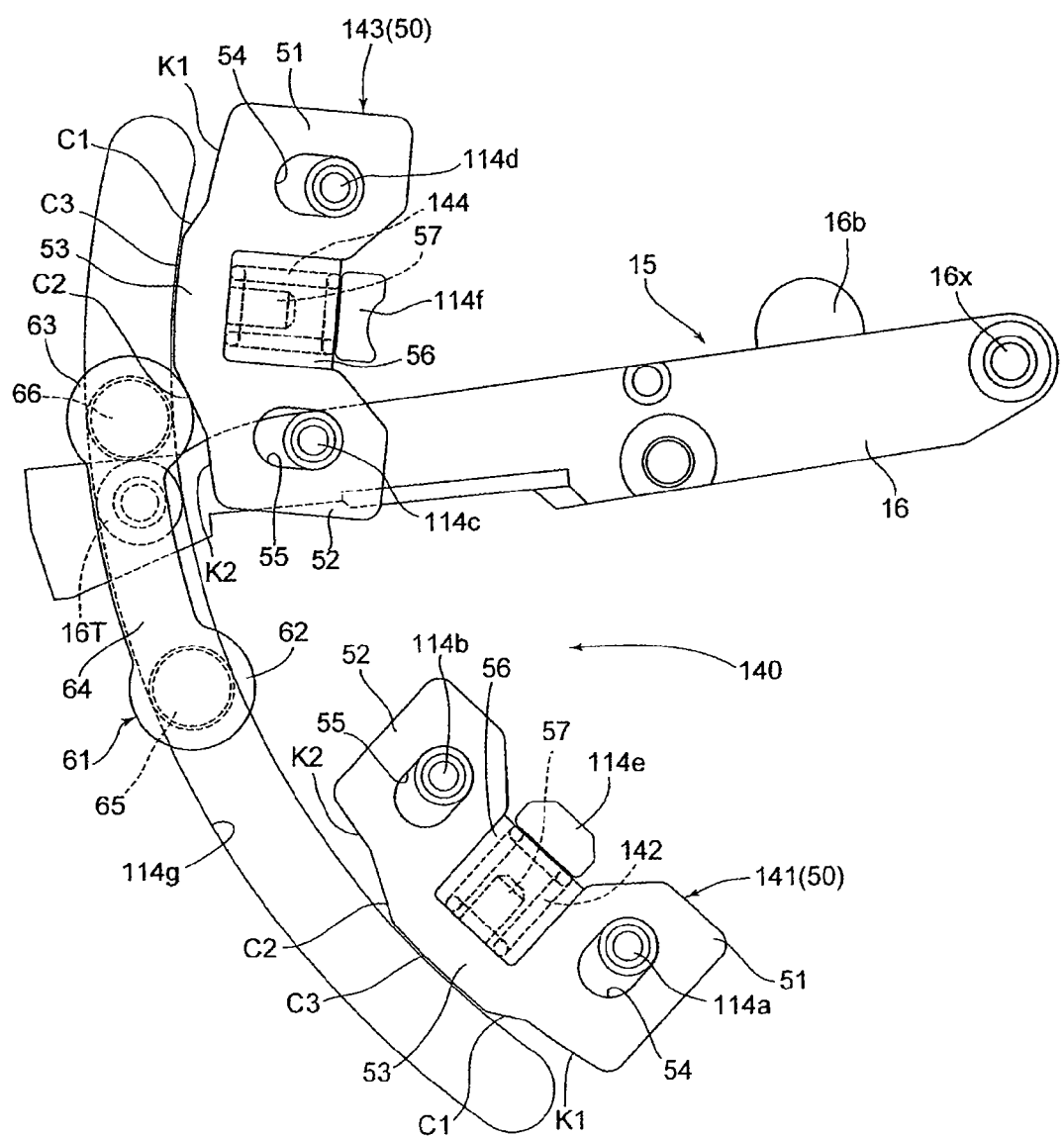
FIG. 26 is a side elevational view of the mirror shock-absorbing mechanism, according to the second embodiment, in a state where the movable mirror is in the process of rotating to the mirror-up position from the mirror-down position.
Figure 27:
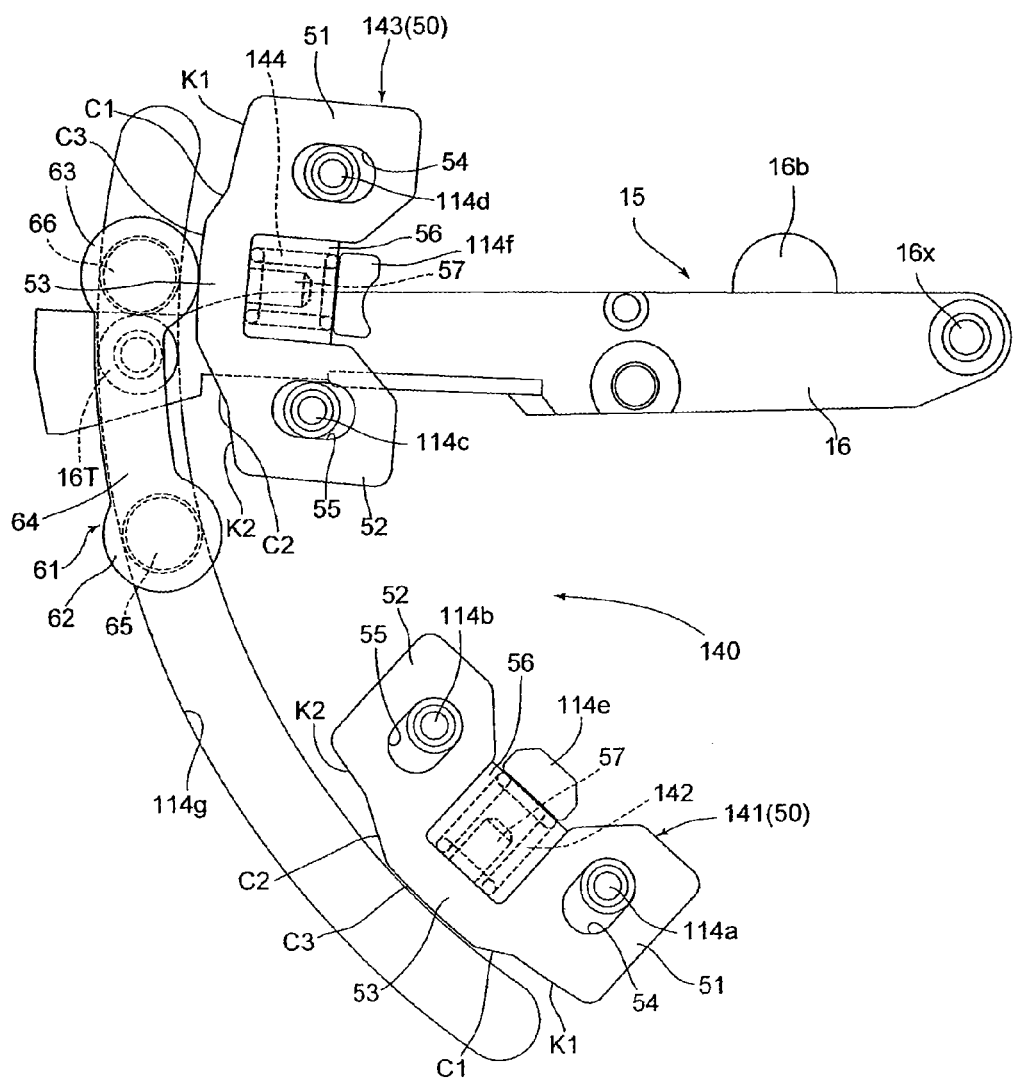
FIG. 27 is a side elevational view of the mirror shock-absorbing mechanism, according to the second embodiment, in a state where the movable mirror is in the process of rotating to the mirror-up position from the mirror-down position.
Figure 28:
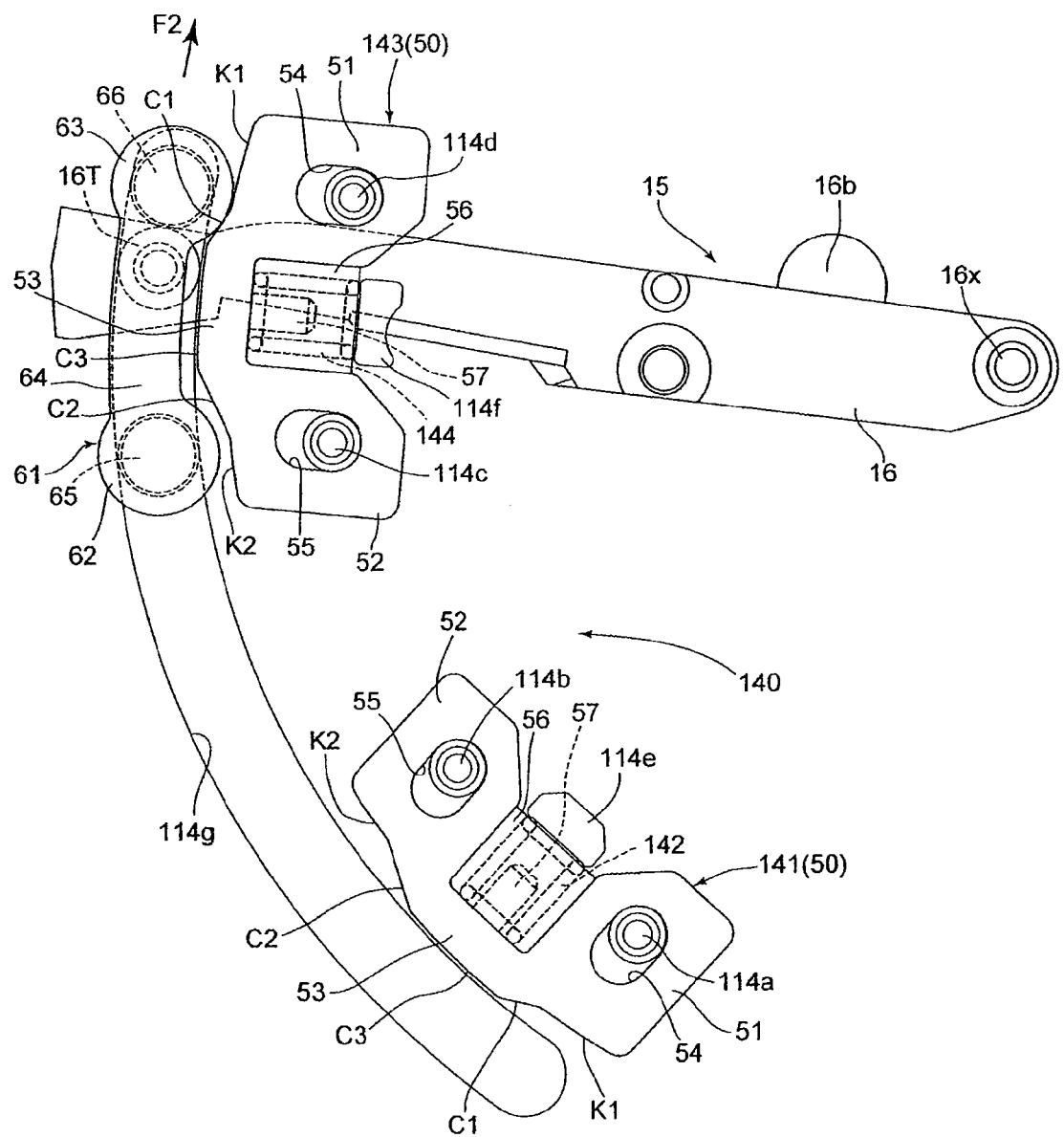
FIG. 28 is a side elevational view of the mirror shock-absorbing mechanism, according to the second embodiment, in the mirror-up state.

As shown in FIGS. 25 through 30, in a state where the mirror-down shock-absorbing member 141 and the mirror-up shock-absorbing member 143 are held at the respective shock-absorbing stand-by positions thereof, respectively, the first cam surface C1, the second cam surface C2 and the third cam surface C3 of each of the two mirror-down shock-absorbing members 141 and 143 lie on a path of the contact portions 62 and 63 of the mirror follower 61. A mirror-up rotation of the movable mirror 15 toward the mirror-up position from the mirror-down position causes the contact portion 62 of the mirror follower 61 which is pressed by the pressing projection 16T as shown in FIG. 25 to pass through the positions of the first cam surface C1, the third cam surface C3 and the second cam surface C2 of the mirror-down shock-absorbing member 141 in that order while pressing and moving the mirror-down shock-absorbing member 141 radially inwards (toward the axis of the pair of mirror seat hinges 16x) from the shock-absorbing stand-by position against the biasing force of the mirror-down shock-absorbing spring 142. Whereas a mirror-down rotation of the movable mirror 15 toward the mirror-down position from the mirror-up position causes the contact portion 63 of the mirror follower 61 which is pressed by the pressing projection 16T as shown in FIG. 28 to pass through the positions of the first cam surface C1, the third cam surface C3 and the second cam surface C2 of the mirror-down shock-absorbing member 143, in that order while pressing and moving the mirror-up shock-absorbing member 143 radially inwards (toward the axis of the pair of mirror seat hinges 16x) from the shock-absorbing stand-by position thereof against the biasing force of the mirror-up shock-absorbing spring 144.

Operations of the mirror shock-absorbing mechanism 140 will be discussed hereinafter. FIG. 25 shows a state where the movable mirror 15 is in the mirror-down position. In this state, the movable mirror 15 is held in the mirror-down position with the mirror seat boss 16b pressed downward by the mirror drive lever 34, which serves as a component of the mirror drive mechanism 30, to make the stopper 16a of the mirror seat 16 abut against the mirror-down position defining pin 20 (see FIG. 1). The mirror-down shock-absorbing member 141 is held at the shock-absorbing stand-by position thereof by the biasing force of the mirror-down shock-absorbing spring 142, while the mirror-up shock-absorbing member 143 is held at the shock-absorbing stand-by position thereof by the biasing force of the mirror-up shock-absorbing spring 144.

The mirror follower 61 is positioned on the radially outer side of the mirror-down shock-absorbing member 191 to be radially opposed thereto with the press-receiving projection 65 contacting the pressing projection 16T. Specifically, the first cam surface C1 and the gently inclined surface k1 which are formed on the wing-shaped portion 51 of the mirror-down shock-absorbing member 191 are in contact with the contact portion 62 of the mirror follower 61. In addition, the contact portion 63 faces the wing-shaped portion 52 of the mirror-down shock-absorbing member 141; however, as shown in FIG. 16, since the second cam surface C2 is more elongated toward the radially inner side than the first cam surface C1 and since the gently inclined surface k2 is provided to be closer to the radially inner side than the gently inclined surface K1, the contact portion 63 is not in contact with either the second cam surface C2 or the gently inclined surface K2. Additionally, the contact portion 64 is not in contact with the third cam surface C3 either, although the contact portion 64 is positioned to face the middle bridge portion 53. In this mirror-down state, the press-receiving projection 65 is not in contact with the lower end of the guide through-hole 114g, so that there is room to allow the mirror follower 61 to further move in a direction F1 (in a direction to move further downward beyond the mirror-down position) shown in FIG. 25. In addition, since the aforementioned space for idle rotation of the movable mirror 15 is provided between the press-receiving projection and the press-receiving projection 66, the pressing projection 16T does not come into contact with the press-receiving projection 66 even if the pressing projection 16T moves toward the mirror-up position by a predetermined amount. Hence, the position of the pressing projection 16T when the movable mirror 15 is in the mirror-down position is not limited by the mirror follower 61. Namely, the mirror-down shock-absorbing member 141 exerts no influence on the setting of the mirror-down position of the movable mirror 15 that is set by the mirror-down position defining pin 20.

When the movable mirror 15 is rotated from the mirror-down position toward the mirror-up position by the mirror drive lever 34 of the mirror drive mechanism 30, at an initial stage of this rotation no rotational force of the movable mirror 15 is transferred to the mirror follower 61 because the pressing projection 16T moves in a direction away from the press-receiving projection 65. Thereafter, the pressing projection 16T comes into contact with the press-receiving projection 66 and presses the press-receiving projection 66 to move the mirror follower 61 (the movable mirror 15) toward the mirror-up position. This movement of the mirror follower 61 toward the mirror-up position causes the contact portion 62 to press the mirror-down shock-absorbing member 141 while sliding on the first cam surface C1, which in turn causes the mirror-down shock-absorbing member 141 to be pressed and moved radially inwards (i.e., toward the axis of the pair of mirror seat hinges 16x) from the shock-absorbing stand-by position (shown in FIG. 25) against the biasing force of the mirror-down shock-absorbing spring 142. During this movement, the contact portion 62 that has a cylindrical outer peripheral shape rides over the first cam surface C1, which is formed as a gentle inclined surface, and accordingly, the movable mirror 15 can be rotated smoothly toward the mirror-up position from the mirror-down position by the mirror drive mechanism 30 with no occurrence of catching between the mirror follower 61 and the mirror-down shock-absorbing member 141. After the contact portion 62 rides over the third cam surface C3 from the first cam surface C1 and passes over the second cam surface C2 and the gently inclined surface K2, following the rotation of the movable mirror 15 in the rotational direction toward the mirror-up position, the mirror-down shock-absorbing member 141 is released from being pressed by the contact portion 62 of the mirror follower 61, thus returning to the shock-absorbing stand-by position by the biasing force of the mirror-down shock-absorbing spring 142.

When the movable mirror 15 approaches the mirror-up position, the contact portion 63 of the mirror follower 61 which is pressed and moved by the pressing projection 16T comes into contact with the second cam surface C2 of the mirror-up shock-absorbing member 143 as shown in FIG. 26. Since the gently inclined surface K2, which is positioned in front of the second cam surface C2 in the forward/rearward direction, is positioned at a shorter radial distance (from the axis of the pair of mirror seat hinges 16x) than the gently inclined surface k1 as illustrated above with reference to FIG. 16, the contact portion 63 does not come into contact with an edge of the wing-shaped portion 52 of the mirror-up shock-absorbing member 143 before coming into contact with the second cam surface C2, thus not interfering with rotation of the movable mirror 15. At the instant shown in FIG. 26, the movable mirror 15 has not yet reached the mirror-up position, and a further rotation of the movable mirror 15 toward the mirror-up position causes the contact portion 63 to press and move the mirror-up shock-absorbing member 143 radially inwards (i.e., toward the axis of the pair of mirror seat hinges 16x; rightward with respect to FIG. 27) from the shock-absorbing stand-by position against the biasing force of the mirror-up shock-absorbing spring 144 while sliding on the second cam surface C2 and subsequently the third cam surface C3 as shown in FIG. 27. The contact portion 63 that has a cylindrical outer peripheral shape can slide smoothly on the second cam surface C2 and the third cam surface C3 of the mirror-up shock-absorbing member 143. During the time the mirror-up shock-absorbing member 143 is pressed by the contact portion 63 of the mirror follower 61 from the shock-absorbing stand-by position, the load of the mirror-up shock-absorbing spring 144 acts against the rotation of the movable mirror 15 via the mirror-up shock-absorbing member 143, the mirror follower 61 (the press-receiving projection 66) and the pressing projection 16T, while the movable mirror 15 rotates while being shock-absorbed by the mirror-up shock-absorbing member 143 and the mirror-up shock-absorbing spring 194. Since the third cam surface C3 of the mirror-up shock-absorbing member 143 has a shape such that the amount of projection thereof toward the radially outer side gradually increases in the moving direction of the contact portion 63 when the movable mirror 15 rotates toward the mirror-up position, the load on the movable mirror 15 gradually increases during the time the contact portion 63 slides on the third cam surface C3 while pressing the third cam surface C3, and the load on the movable mirror 15 becomes maximum immediately before the contact portion 63 rides over the third cam surface C3 toward the first cam surface C1 side.

When the movable mirror 15 is rotated to the mirror-up position that is shown in FIG. 28, an upper surface of the mirror seat 16 comes into contact with the upper stopper 21, so that the movable mirror 15 is prevented from further rotating upward (see FIG. 1). In this mirror-up state, the contact portion 63 of the mirror follower 61 has reached a position opposing the wing-shaped portion 51 of the mirror-up shock-absorbing member 143 after riding over the third cam surface C3 of the mirror-up shock-absorbing member 143, and the mirror-up shock-absorbing member 143 which has been released from being pressed by the mirror follower 61 has returned to the shock-absorbing stand-by position by the biasing force of the mirror-up shock-absorbing spring 144. The mirror follower 61 is positioned on the radially outer side of the mirror-up shock-absorbing member 193 with the contact portion 63 brought into contact with the first cam surface C1 and the gently inclined surface K1, the contact portion 62 faces the wing-shaped portion 52 of the mirror-up shock-absorbing member 143 while being slightly spaced from the second cam surface C2 and the gently inclined surface K2, and the connecting portion 64 faces the middle bridge portion 53 of the mirror-up shock-absorbing member 143 while being slightly spaced from the third cam surface C3.

In this state, if a force to move the movable mirror 15 back toward the mirror-down position is acted upon the movable mirror 15 which has reached the mirror-up position, the movable mirror 15 slightly rotates to cause the pressing projection 16T to come into contact with the press-receiving projection 65. From this state, if the movable mirror 15 attempts to further rotate toward the mirror-down position, resistance is exerted on the movement of the mirror follower 61 by engagement between the first cam surface C1 of the mirror-up shock-absorbing member 143 (which has returned to the shock-absorbing stand-by position) and the contact portion 63. In order for the movable mirror 15 to further rotate toward the mirror-down position, it is required to press and move the mirror-up shock-absorbing member 143 against the biasing force of the mirror-up shock-absorbing spring 144; however, unlike the movement of the movable mirror 15 caused by the driving force of the mirror drive mechanism 30, the reaction of the movable mirror 15 caused upon the movable mirror 15 reaching the mirror-up position cannot exert a force on the mirror-up shock-absorbing member 143 which is strong enough to move the mirror-up shock-absorbing member 143, which is biased by the mirror-up shock-absorbing spring 144, so that the amount of bouncing of the movable mirror 15 can be limited within a predetermined amount. Namely, the mirror-up shock-absorbing member 143 in effect serves as a stopper for preventing the movable mirror 15 from bouncing excessively upon the movable mirror 15 moving to the mirror-up position.

In the mirror-up state shown in FIG. 28, the press-receiving projection 66 is not in contact with the upper end of the guide through-hole 114g, so that there is room to allow the mirror follower 61 to further move in a direction F2 (toward the mirror-up position) shown in FIG. 28. In addition, since the aforementioned space for idle rotation of the movable mirror 15 is provided between the pressing projection 16T and the press-receiving projection 65. Hence, the position of the pressing projection 16T when the movable mirror 15 is in the mirror-up position is not limited by the mirror follower 61, and the mirror-down shock-absorbing member 143 exerts no influence on the setting of the mirror-up position of the movable mirror 15 that is set by the upper stopper 21.

As described above, when the movable mirror 15 is rotated from the mirror-down position toward the mirror-up position, at an initial stage of this rotation (i.e., during a period of time from the instant at which the pressing projection 16T is disengaged from the press-receiving projection 65 until the instant at which the pressing projection 16T comes into contact with the press-receiving projection 66) no load of the mirror-down shock-absorbing member 191 acts on the movable mirror 15, and accordingly, loads which act on the movable mirror 15 during the initial motion thereof are small. After the pressing projection 16T comes into contact with the press-receiving projection 66, the mirror follower 61 is pressed and moved upward following the rotation of the movable mirror 15 toward the mirror-up position while the mirror-down shock-absorbing member 141 is pressed to move radially inwards from the shock-absorbing stand-by position against the biasing force of the mirror-down shock-absorbing spring 142; however, the movable mirror 15 can be made to rotate smoothly with less load because the load on a movable mirror (quick-return mirror) usually becomes maximum at an initial stage of the rotation thereof from the mirror-down position or the mirror-up position and because the mirror-down shock-absorbing member 141 is pressed a little later than this initial stage. In addition, when the mirror-down shock-absorbing member 141 presses the mirror follower 61 when the movable mirror 15 rotates toward the mirror-up position from the mirror-down position as described above, there is no possibility of excessive resistance occurring, which otherwise may be caused by the mirror follower 61 getting caught on the mirror-down shock-absorbing member 141 because the contact portion 62 which has a cylindrical outer peripheral shape slides on the first cam surface C1, which is gently inclined.

When the movable mirror 15 approaches the mirror-up position, the load of the mirror-up shock-absorbing spring 144 acts on the movable mirror 15 to absorb shock of the movable mirror 15 while the mirror-up shock-absorbing member 143 is pressed and moved from the shock-absorbing stand-by position by the contact portion 63 of the mirror follower 61. The amount of rebouncing of the movable mirror 15 toward the mirror-down position upon the movable mirror 15 reaching the mirror-up position is limited by the mirror-up shock-absorbing member 143 which has returned to the shock-absorbing stand-by position. Accordingly, the mirror-up shock-absorbing member 143, which is a single member, can absorb shock of the movable mirror 15 upon the movable mirror 15 reaching the mirror-up position and also suppress bounce of the movable mirror 15 immediately after the movable mirror 15 reaches the mirror-up position.

Conversely to the above described operations to move the movable mirror 15 to the mirror-up position, when the movable mirror 15 is rotated toward the mirror-down position from the mirror-up position that is shown in FIG. 28 by the mirror drive lever 34 of the mirror drive mechanism 30, at an initial stage of this rotation of the movable mirror 15, no rotational force of the movable mirror 15 is transferred to the mirror follower 61 because the pressing projection 16T moves in a direction away from the press-receiving projection 66. Thereafter, the pressing projection 16T comes into contact with the press-receiving projection 65 and presses the press-receiving projection 65 to move the mirror follower 61 (the movable mirror 15) toward the mirror-down position. This movement of the mirror follower 61 toward the mirror-down position causes the contact portion 63 to press the mirror-down shock-absorbing member 143 while sliding on the first cam surface C1. Similar to the mirror-down shock-absorbing member 141 when the movable mirror 15 rotates toward the mirror-up position from the mirror-down position, the mirror-down shock-absorbing member 143 is moved radially inwards (i.e., toward the axis of the pair of mirror seat hinges 16x) from the shock-absorbing stand-by position against the biasing force of the mirror-up shock-absorbing spring 144; however, the second embodiment of the mirror shock-absorbing mechanism does not interfere with the driving of the movable mirror 15 by the mirror drive mechanism 30 because the first cam surface C1, which is formed as a smooth inclined surface, is pressed by the contact portion 63 that has a cylindrical peripheral surface. After the contact portion 63 of the mirror follower 61, which is pressed and moved by the pressing projection 16T, rides over the third cam surface C3 from the first cam surface C1 and passes over the second cam surface C2, the mirror-up shock-absorbing member 143 is released from being pressed by the contact portion 63 of the mirror follower 61, thus returning to the shock-absorbing stand-by position by the biasing force of the mirror-up shock-absorbing spring 144.

Figure 29:
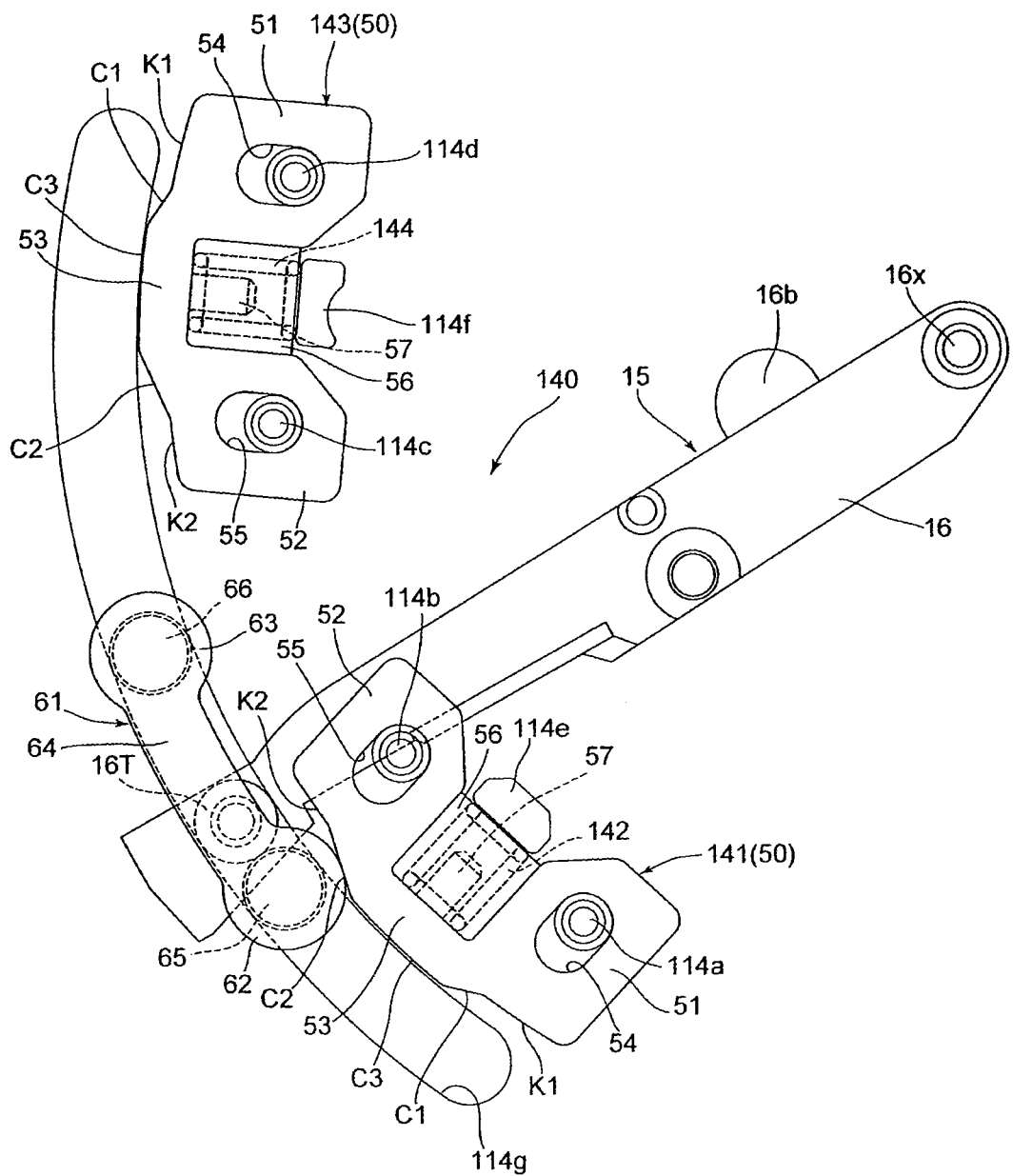
FIG. 29 is a side elevational view of the mirror shock-absorbing mechanism, according to the second embodiment, in a state where the movable mirror is in the process of rotating to the mirror-down position from the mirror-up position.
Figure 30:
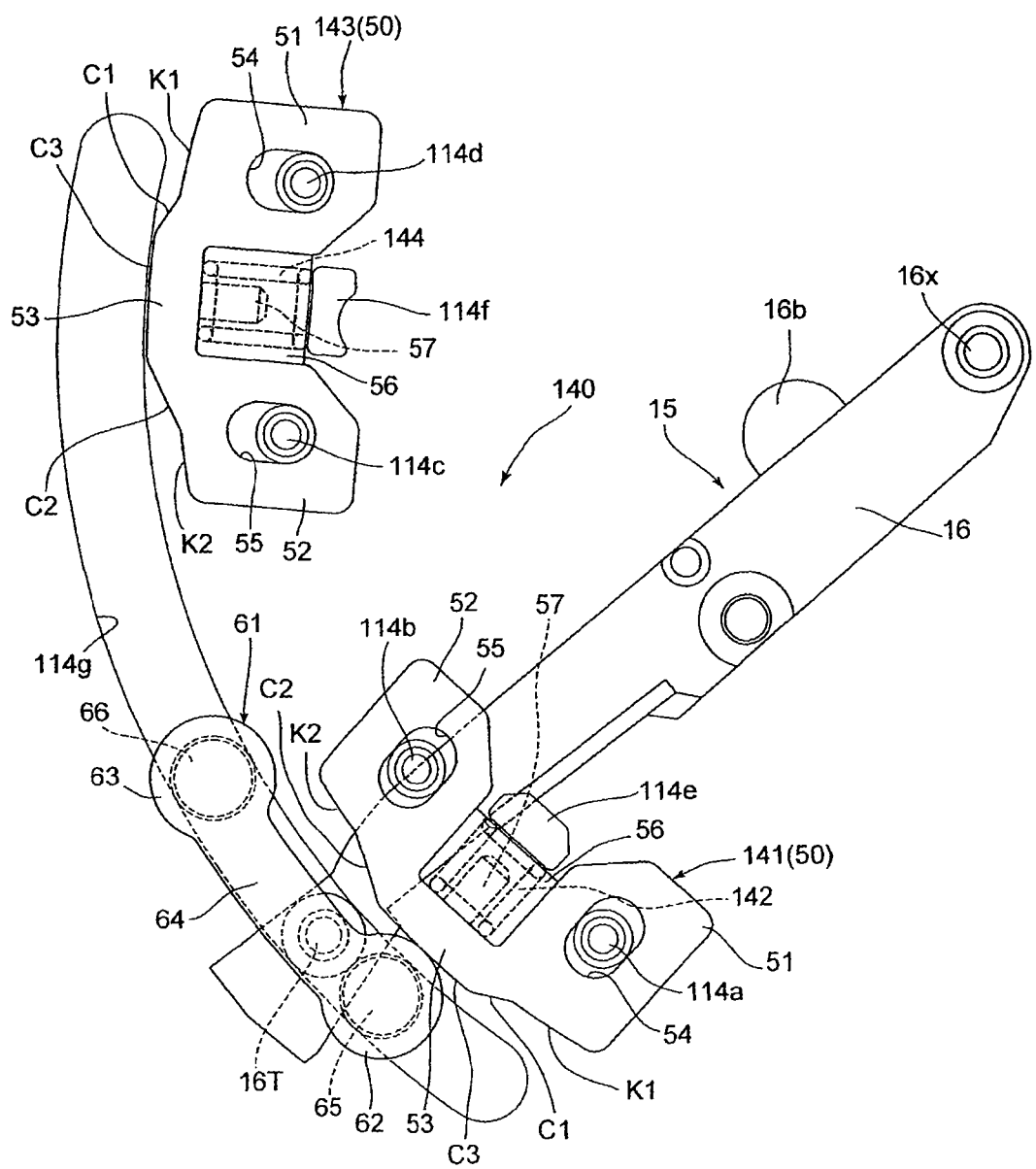
FIG. 30 is a side elevational view of the mirror shock-absorbing mechanism, according to the second embodiment, in a state where the movable mirror is in the process of rotating to the mirror-down position from the mirror-up position.

When the movable mirror 15 approaches the mirror-down position, the contact portion 62 of the mirror follower 61 comes into contact with the second cam surface C2 of the mirror-down shock-absorbing member 141 as shown in FIG. 29. Since the gently inclined surface K2, which is positioned in front of the second cam surface C2 in the forward/rearward direction, is positioned at a shorter radial distance (from the axis of the pair of mirror seat hinges 16x) than the gently inclined surface k1 as illustrated above with reference to FIG. 16, the contact portion 62 does not come into contact with an edge of the wing-shaped portion 52 of the mirror-down shock-absorbing member 141 before coming into contact with the second cam surface C2, thus not interfering with rotation of the movable mirror 15. At the instant shown in FIG. 29, the movable mirror 15 has not yet reached the mirror-down position, and a further rotation of the movable mirror 15 toward the mirror-down position causes the contact portion 62 to press and move the mirror-down shock-absorbing member 141 radially inwards (i.e., toward the axis of the pair of mirror seat hinges 16x) from the shock-absorbing stand-by position against the biasing force of the mirror-down shock-absorbing spring 142 while sliding from the second cam surface C2 to the third cam surface C3 thereon as shown in FIG. 30. The contact portion 62 that has a cylindrical outer peripheral shape can slide smoothly on the second cam surface C2 and the third cam surface C3 of the mirror-up shock-absorbing member 141. During the time the mirror-down shock-absorbing member 141 is pressed by the contact portion 62 of the mirror follower 61 from the shock-absorbing stand-by position, the load of the mirror-down shock-absorbing spring 142 acts against the rotation of the movable mirror 15 via the mirror-down shock-absorbing member 141, the mirror follower 61 (the press-receiving projection 65) and the pressing projection 16T, while the movable mirror 15 rotates while being shock-absorbed by the mirror-down shock-absorbing member 141 and the mirror-down shock-absorbing spring 142. Since the third cam surface C3 of the mirror-down shock-absorbing member 141 has a shape such that the amount of projection thereof toward the radially outer side gradually increases in the moving direction of the contact portion 62 when the movable mirror 15 rotates toward the mirror-down position, the load on the movable mirror 15 gradually increases during the time the contact portion 62 slides on the third cam surface C3 while pressing the third cam surface C3, and the load on the movable mirror 15 becomes maximum immediately before the contact portion 62 rides over the third cam surface C3 toward the first cam surface C1 side.

When the movable mirror 15 is rotated to the mirror-down position that is shown in FIG. 25, the stopper 16a of the mirror seat 16 comes into contact with the mirror-down position defining pin 20, so that the movable mirror 15 is prevented from further rotating downward (see FIG. 1). In this mirror-down state, the contact portion 62 of the mirror follower 61 has reached a position opposing the gently inclined surface k1 after riding over the third cam surface C3 of the mirror-down shock-absorbing member 141, and the mirror-down shock-absorbing member 141 which has been released from being pressed by the mirror follower 61 has returned to the shock-absorbing stand-by position by the biasing force of the mirror-down shock-absorbing spring 142. The mirror follower 61 is positioned on the radially outer side of the mirror-down shock-absorbing member 141 with the contact portion 62 brought into contact with the first cam surface C1 and the gently inclined surface K1, the contact portion 63 faces the wing-shaped portion 52 of the mirror-down shock-absorbing member 141 while being slightly spaced from the second cam surface C2 and the gently inclined surface K2, and the connecting portion 64 faces the middle bridge portion 53 of the mirror-down shock-absorbing member 141 while being slightly spaced from the third cam surface C3.

In this state, if a force to move the movable mirror 15 back toward the mirror-up position is acted upon the movable mirror 15 which has reached the mirror-down position, the movable mirror 15 slightly rotates to cause the pressing projection 16T to come into contact with the press-receiving projection 66. From this state, if the movable mirror 15 attempts to further rotate toward the mirror-up position, resistance is exerted on movement of the mirror follower 61 by engagement between the first cam surface C1 of the mirror-down shock-absorbing member 141 (which has returned to the shock-absorbing stand-by position) and the contact portion 62. In order for the movable mirror 15 to further rotate toward the mirror-up position, it is required to press and move the mirror-down shock-absorbing member 141 against the biasing force of the mirror-down shock-absorbing spring 142; however, unlike the movement of the movable mirror 15 caused by the driving force of the mirror drive mechanism 30, the reaction of the movable mirror 15 caused upon the movable mirror 15 reaching the mirror-down position cannot exert a force on the mirror-down shock-absorbing member 141 which is strong enough to move the mirror-down shock-absorbing member 141, which is biased by the mirror-down shock-absorbing spring 142, so that the amount of bouncing of the movable mirror 15 can be limited within a predetermined amount. Namely, the mirror-down shock-absorbing member 141 in effect serves as a stopper for preventing the movable mirror 15 from bouncing excessively upon the movable mirror 15 moving to the mirror-down position.

As described above, when the movable mirror 15 is rotated from the mirror-up position toward the mirror-down position, at an initial stage of this rotation (i.e., during a period of time from the instant at which the pressing projection 16T is disengaged from the press-receiving projection 66 until the instant at which the pressing projection 16T comes into contact with the press-receiving projection 65), no load of the mirror-up shock-absorbing member 143 acts on the movable mirror 15, and accordingly, the load that acts on the movable mirror 15 during the initial motion thereof is small. At a stage in which the pressing projection 16T comes into contact with the press-receiving projection 65 and subsequently presses and moves the mirror-up shock-absorbing member 143 from the shock-absorbing stand-by position against the biasing force of the mirror-up shock-absorbing spring 144 via the mirror follower 61, the movable mirror 15 already rotates at a certain speed, so that the load on the driving of the movable mirror 15 can be suppressed compared with a structure in which the mirror-up shock-absorbing member 143 is pressed and moved at an initial stage of the rotation of the movable mirror 15 from the mirror-up position toward the mirror-down position, at which a relatively large load is exerted on the movable mirror 15. In addition, when the mirror-up shock-absorbing member 143 presses the mirror follower 61 when the movable mirror 15 rotates toward the mirror-down position from the mirror-up position as described above, there is no possibility of excessive resistance occurring, which may otherwise be caused by the mirror follower 61 getting caught on the mirror-down shock-absorbing member 143 because the contact portion 62 which has a cylindrical outer peripheral shape slides on the first cam surface C1, which is gently inclined.

When the movable mirror 15 approaches the mirror-down position, the load of the mirror-down shock-absorbing spring 142 acts on the movable mirror 15 to absorb shock of the movable mirror 15 while the mirror-down shock-absorbing member 141 is pressed and moved from the shock-absorbing stand-by position by the contact portion 62 of the mirror follower 61. The amount of rebouncing of the movable mirror 15 toward the mirror-up position upon the movable mirror 15 reaching the mirror-down position is limited by the mirror-down shock-absorbing member 141 which has returned to the shock-absorbing stand-by position. Accordingly, the mirror-down shock-absorbing member 141, which is a single member, can absorb shock of the movable mirror 15 upon the movable mirror 15 reaching the mirror-down position and also suppress bounce of the movable mirror 15 immediately after the movable mirror 15 reaches the mirror-down position.

Although the present invention has been described with reference to the above illustrated embodiments of the mirror shock-absorbing mechanisms, the present invention is not limited to these particular embodiments. For instance, the third cam surface C3 of each slide member 50 can be shaped to be symmetrical with respect to the imaginary center line G1. Specifically, the third cam surface C3 can be formed as a circular arc surface having a constant radius about the axis of the pair of mirror seat hinges 16x. In this case, during the time the large diameter portion 60b of the roller 60 in the first embodiment of the mirror shock-absorbing mechanism or the contact portion 62 or 63 of the mirror follower 61 in the second embodiment of the mirror shock-absorbing mechanism moves on the third cam surface C3, the load on the roller 60 or the mirror follower 61 is constant at all times.

In addition, the shapes of the first cam surface C1 and the second cam surface C2 can be formed into different shapes from those described above. For instance, although the first cam surface C1 and the second cam surface C2 of each slide member 50 are respectively formed as two inclined surfaces, the inclination angles of which are substantially to the same as each other (see FIG. 16) in the above illustrated embodiments (in opposite directions with respect to the imaginary center line G1), the inclination angles of the first cam surface C1 and the second cam surface C2 of each slide member 50 with respect to the imaginary center line G1 can be formed differently from each other. Since the load on the roller 60 in the first embodiment of the mirror shock-absorbing mechanism or the mirror follower 61 in the second embodiment of the mirror shock-absorbing mechanism varies in accordance with the inclination angle of each cam surface, the following two types of settings are possible: the inclination angle of the first cam surface C1 can be set larger (than the illustrated embodiments) when importance is placed on the effect of suppressing bounce of the movable mirror 15 upon the movable mirror 15 rotating to the mirror-up position or the mirror-down position, or the inclination angle of the second cam surface C2 can be set larger (than the illustrated embodiments) when importance is placed on the mirror shock-absorbing performance in the middle of the mirror-up operation or the mirror-down operation. In other words, each of the first cam surface C1, the second cam surface C2 and the third cam surface C3 of each slide member 50 can take any shape as appropriate in accordance with the load setting intended for the movable mirror 15.

In the first embodiment of the mirror shock-absorbing mechanism 40, the roller 60, which is provided on the mirror seat 16 that is an element of the movable mirror 15, is made to come into contact with each of the mirror-down shock-absorbing member 41 and the mirror-up shock-absorbing member 43. However, in the mirror shock-absorbing mechanism according to an aspect of the present invention in which two shock-absorbing members which function when the movable mirror moves up and down, respectively, are designed to have the same specifications, it is possible to provide a driven member (follower) which moves while following the rotation of the movable mirror 15, and to bring this driven member into contact with each of the mirror-down shock-absorbing member 41 and the mirror-up shock-absorbing member 43 in a similar manner to the mirror follower 61 in the second embodiment of the mirror shock-absorbing mechanism. In addition, in the case of providing the movable mirror 15 with a pressing portion which presses a shock-absorbing member like the first embodiment of the mirror shock-absorbing mechanism, it is desirable that this pressing portion be a rotatable portion like the roller 60; however, it is possible to bring an irrotatable portion as the pressing portion into contact with each of the mirror-down shock-absorbing member 41 and the mirror-up shock-absorbing member 43.

The second embodiment of the mirror shock-absorbing mechanism 140 is equipped with two shock-absorbing members: the mirror-down shock-absorbing member 141 and the mirror-up shock-absorbing spring 142. However, in the mirror shock-absorbing mechanism according to an aspect of the present invention in which space for idle rotation of the movable mirror is provided between the movable mirror and the mirror follower so that no load of either shock-absorbing member acts on the movable mirror at an initial stage of the rotation of the movable mirror, it is possible to provide only one of the two shock-absorbing members: the shock-absorbing member which operates when the movable mirror rotates to the mirror-down position, and the shock-absorbing member which operates when the movable mirror rotates to the mirror-up position. For instance, it is possible to omit the mirror-up shock-absorbing member 143 and the mirror-up shock-absorbing spring 144 so that the mirror-shock absorbing mechanism can operate only when the movable mirror rotates to the mirror-down position. In this embodiment also, the loads of the mirror-down shock-absorbing member 141 and the mirror-up shock-absorbing spring 142, which suppress bounce of the movable mirror 15 when the movable mirror 15 rotates to the mirror-down position, do not act on the movable mirror 15 at an initial stage of the rotation of the movable mirror 15 when the movable mirror 15 rotates to the mirror-up position, so that the effect of reducing load on the initial motion of the movable mirror 15 when the movable mirror 15 rotates toward the mirror-up position from the mirror-down position can be obtained. Conversely, it is possible to omit the mirror-down shock-absorbing member 141 and the mirror-down shock-absorbing spring 142 so that the mirror shock-absorbing mechanism with the mirror-up shock-absorbing member 143 and the mirror-up shock-absorbing spring 144 can operate only when the movable mirror 15 rotates to the mirror-up position. Additionally, in the second embodiment of the mirror shock-absorbing mechanism 140, the mirror-down shock-absorbing member 141 and the mirror-up shock-absorbing member 143 are mutually identical in specifications, which makes it possible to obtain a cost reduction effect via component commonality (common application of necessary components); however, the shock-absorbing member which operates when the movable mirror rotates to the mirror-down position and the shock-absorbing member which operates when the movable mirror rotates to the mirror-up position can be has mutually different specifications.

Additionally, in the second embodiment of the mirror shock-absorbing mechanism 140, the pair of press-receiving projections 65 and 66 of the mirror follower 61 and the pressing projection 16T on a side of the movable mirror 15 are each formed as a projection having a perfect-circular cross sectional shape. Although this shape is superior for ease of production, anti-catching properties when the pressing projection 16T is brought into contact with either shock-absorbing member and the ability to respond to delicate component dimensional error on each product, and the shapes of contact portions of the movable mirror 15 and the mirror follower 61 which come into contact with each other are not limited to this particular shape. For instance, in each of the pair of press-receiving projections 65 and 66, a surface thereof with which the pressing projection 16T comes into contact, can be formed as a flat surface or a curved surface having a noncircular cross section.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A movable mirror shock-absorbing mechanism of a camera, comprising:
    a movable mirror which is supported to be rotatable between a viewfinder light-guiding position, in which said movable mirror is positioned in a photographing optical path to reflect incident light emanated from an object toward a viewfinder optical system of said camera, and a retracted position, in which said movable mirror is retracted from said photographing optical path to allow the object-emanated light to travel toward a photographic light-receiving medium;
    a mirror follower which includes a first press-receiving portion and a second press-receiving portion that are pressed by said movable mirror when said movable mirror rotates toward said viewfinder light-guiding position and said retracted position, respectively, which moves with the rotation of said movable mirror by either of said first press-receiving portion and said second press-receiving portion being pressed by said movable mirror, and which includes space for idle rotation of said movable mirror that is formed between said first press-receiving portion and said second press-receiving portion to allow said movable mirror to rotate without making said movable mirror contact either of said first press-receiving portion and said second press-receiving portion; and
    a shock-absorbing member which absorbs shock of said movable mirror by being pressed by said mirror follower moving with rotation of said movable mirror,
    wherein, when said movable mirror rotates from one of said retracted position and said viewfinder light-guiding position toward the other of said retracted position and said viewfinder light-guiding position, said movable mirror rotates without pressing said mirror follower during an initial rotation of said movable mirror, due to said space for idle rotation of said movable mirror, and subsequently rotates while pressing said mirror follower.

2. The movable mirror shock-absorbing mechanism according to claim 1, wherein said shock-absorbing member is held by a biaser at a shock-absorbing stand-by position at which said shock-absorbing member lies in a rotational path of said mirror follower, and moves against a biasing force of said biaser when pressed by said mirror follower.

3. The movable mirror shock-absorbing mechanism according to claim 2, wherein said shock-absorbing member is supported to be movable linearly in a direction intersecting said rotational path of said mirror follower, and said shock-absorbing member is biased in a biasing direction away from a rotational axis of said movable mirror by said biaser to be held at said shock-absorbing stand-by position,
    wherein said shock-absorbing member comprises:
    an outer-edge cam surface which is positioned on an outer edge of said shock-absorbing member that is farthest from said rotational axis of said movable mirror; and
    a pair of inclined cam surfaces which are connected to opposite ends of said outer-edge cam surface, respectively, and wherein each of said pair of inclined cam surfaces is inclined toward said rotational axis of said movable mirror in a direction away from said outer-edge cam surface,
    wherein said outer-edge cam surface and said pair of inclined cam surfaces are positioned in said rotational path of said mirror follower when said shock-absorbing member is held at said shock-absorbing stand-by positions thereof,
    wherein, during rotation of said movable mirror between said retracted position and said viewfinder light-guiding position, said mirror follower presses a first inclined cam surface of said pair of inclined cam surfaces of said shock-absorbing member and thereafter presses said outer-edge cam surface of said shock-absorbing member to move said shock-absorbing member away from said shock-absorbing stand-by position thereof, and subsequently, said shock-absorbing member returns to said shock-absorbing stand-by position thereof to thereby move said mirror follower to a position opposed to a second inclined cam surface of said pair of inclined cam surfaces of said shock-absorbing member upon said movable mirror rotating to one of said retracted position and said viewfinder light-guiding position, and
    wherein said second inclined cam surface is formed on an edge, of said shock-absorbing member, that is positioned farther from the rotational axis of said movable mirror than that of said first inclined cam surface.

4. The movable mirror shock-absorbing mechanism according to claim 1, wherein said camera comprises a mirror box which supports said movable mirror,
    wherein a guide hole which extends along a rotational path of said movable mirror is formed in said mirror box, and
    wherein each of said first press-receiving portion and said second press-receiving portion of said mirror follower comprises a projection which is slidably inserted into said guide hole.

5. The movable mirror shock-absorbing mechanism according to claim 4, wherein said movable mirror comprises a pressing projection which is positioned between said first press-receiving portion and said second press-receiving portion, wherein said pressing projection selectively presses said first press-receiving portion and said second press-receiving portion in accordance with the rotation of said movable mirror.

6. The movable mirror shock-absorbing mechanism according to claim 1, wherein said mirror follower comprises a first contact portion and a second contact portion,
    wherein said shock-absorbing member comprises:
    a first shock-absorbing member which comes into contact with said first contact portion when said movable mirror is in said viewfinder light-guiding position; and
    a second shock-absorbing member which comes into contact with said second contact portion when said movable mirror is in said retracted position.

7. The movable mirror shock-absorbing mechanism according to claim 6, wherein said mirror follower comprises a connecting portion which connects said first contact portion and said second contact portion to each other with a space therebetween in a moving direction of said mirror follower, and wherein said first press-receiving portion and said second press-receiving portion are formed to project from said first contact portion and said second contact portion, respectively.

8. The movable mirror shock-absorbing mechanism according to claim 7, wherein said first shock-absorbing member and said second shock-absorbing member are mutually identical in specifications.

9. The movable mirror shock-absorbing mechanism according to claim 1, wherein said camera comprises a mirror box which accommodates and supports said movable mirror, and wherein said shock-absorbing member is supported on one side of said mirror box.

10. The movable mirror shock-absorbing mechanism according to claim 4, wherein said mirror follower is elongated along said guide hole.

* * * * *